(12) United States Patent
Massie et al.

(10) Patent No.: US 10,737,800 B2
(45) Date of Patent: Aug. 11, 2020

(54) CATALYTIC INERTING SYSTEM ARCHITECTURE AND CONTROL METHODS FOR INCREASED FUEL TANK SAFETY

(71) Applicant: Parker-Hannifin Corporation, Cleveland, OH (US)

(72) Inventors: Daniel Christopher Massie, Mission Viejo, CA (US); Bryan David Jensen, Mission Viejo, CA (US); Gustavo Toriz, Laguna Niguel, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 360 days.

(21) Appl. No.: 15/935,339

(22) Filed: Mar. 26, 2018

(65) Prior Publication Data
US 2018/0354644 A1 Dec. 13, 2018

Related U.S. Application Data

(60) Provisional application No. 62/516,275, filed on Jun. 7, 2017.

(51) Int. Cl.
*B01D 53/02* (2006.01)
*B64D 37/34* (2006.01)
(Continued)

(52) U.S. Cl.
CPC .......... *B64D 37/34* (2013.01); *B01D 53/864* (2013.01); *B01D 53/8668* (2013.01);
(Continued)

(58) Field of Classification Search
CPC ........ B01D 2257/102; B01D 2257/702; B01D 2259/4575; B01D 53/864; B01D 53/8668; B64D 37/005; B64D 37/32; B64D 37/34
See application file for complete search history.

(56) References Cited

U.S. PATENT DOCUMENTS 3,847,298 A * 11/1974 Hamilton ................. B01J 19/14
220/88.3
7,459,081 B2 12/2008 Koenig et al.
(Continued)

FOREIGN PATENT DOCUMENTS

WO WO 2007008730 1/2007

OTHER PUBLICATIONS

Clodfelter, Robert G.: "Fuel Tank Inerting Using Catalytic Combustion Techniques", FAA Report of Conference, AD711059, May 1970, pp. 141-170.
(Continued)

*Primary Examiner* — Christopher P Jones
(74) *Attorney, Agent, or Firm* — Renner, Otto, Boisselle & Sklar, LLP

(57) ABSTRACT

A catalytic inerting system (CIS) architecture includes a fuel tank including a fuel tank inlet and a fuel tank outlet, the fuel tank defining a space for containing a liquid fuel and an ullage space above the liquid fuel containing an ullage gas. A catalytic reactor is in fluid communication with the fuel tank, the catalytic reactor having a catalytic inlet and a catalytic outlet, wherein the catalytic reactor receives an ullage gas flow from the fuel tank outlet and performs a catalytic reaction on the ullage gas to produce a more inert flow from the catalytic outlet to the fuel tank inlet. A bypass line provides a flow pathway between the fuel tank inlet and the fuel tank outlet, thereby bypassing the fuel tank, and a flow control mechanism controls relative flows of the inert flow from the catalytic outlet to the fuel tank inlet versus through the bypass line.

28 Claims, 20 Drawing Sheets

(51) Int. Cl.
    *B64D 37/32*     (2006.01)
    *B01D 53/86*     (2006.01)
    *B64D 37/00*     (2006.01)

(52) U.S. Cl.
    CPC ........... *B64D 37/005* (2013.01); *B64D 37/32* (2013.01); *B01D 2257/102* (2013.01); *B01D 2257/702* (2013.01); *B01D 2259/4575* (2013.01)

(56) References Cited

U.S. PATENT DOCUMENTS

| | | | |
|---|---|---|---|
| 7,628,965 | B2 | 12/2009 | Johnson et al. |
| 7,694,916 | B2 | 4/2010 | Limaye et al. |
| 7,735,670 | B2 | 6/2010 | Zaki et al. |
| 7,896,292 | B2 | 3/2011 | Limaye et al. |
| 7,905,259 | B2 | 3/2011 | Johnson et al. |
| 8,602,362 | B2 | 12/2013 | Buchwald |
| 8,904,669 | B2 | 12/2014 | Tichborne et al. |
| 2005/0115404 | A1* | 6/2005 | Leigh .................. B64D 37/32 95/11 |
| 2009/0302163 | A1 | 12/2009 | Sanford | 
| 2011/0094205 | A1 | 4/2011 | Rehling |
| 2011/0256042 | A1 | 10/2011 | Tichborne et al. |
| 2015/0314229 | A1 | 11/2015 | Johnson et al. |

OTHER PUBLICATIONS

Wainright, R.B., et al.: "Generation of Inerting Gases for Aircraft Fuel Tanks by Catalytic Combustion Techniques", Technical Report AFAPL-TR-69-68, vol. 1, Aug. 1969.
Wainright, R.B., et al.: "Generation of Inerting Gases for Aircraft Fuel Tanks by Catalytic Combustion Techniques", Technical Report AFAPL-TR-69-68, vol. 2, Aug. 1969.
Hamilton, MacKenzie L.: "Aircraft Fuel Tank Inerting Program vol. 1, Data", Technical Report AFAPL-TR-70-83, vol. 1, Jan. 1971.
Warner, John L., et al.: "A Fuel Tank Inerting System for Military Aircraft", Technical Report AFAPL-TR-70-85, vol. 1, Feb. 1971.
McDonald, George H., et al.: "Catalytic Reactor for Inerting of Aircraft Fuel Tanks", Technical Report AFAPL-TR-74-49, Jun. 1974.
Manatt, Scott A.: "Feasibility Study of Nitrogen Generation for Fuel Tank Inerting", Report No. FAA RD 74-112, Jun. 1974.

* cited by examiner

CATALYTIC INERTING SYSTEM ARCHITECTURE AND CONTROL METHODS FOR INCREASED FUEL TANK SAFETY

This application claims priority to U.S. Provisional Patent Application No. 62/516,275 filed Jun. 7, 2017, which is hereby incorporated herein by reference.

FIELD OF INVENTION

The present invention relates generally to fuel systems including aircraft fuel systems, and more particularly to catalytic inerting systems that render fuel tank ullage gases inert and related methods of controlling such systems.

BACKGROUND

This present disclosure addresses operational safety-related issues present in conventional architectures of an ullage recirculating, Catalytic Inerting System (CIS). Ullage gas is the air and fuel vapor mixture that exists over the top of the liquid fuel in a fuel tank. In conventional CIS architectures, the ullage gas is recirculated, with the ullage gas being drawn from the fuel tank and reacted in a catalytic reactor. The catalytic process within the catalytic reactor causes oxygen and fuel vapor present in the ullage gas to chemically react and produce relatively inert chemical species, namely carbon dioxide and water vapor. Nitrogen, which typically is by far the largest component of the ullage gas, is inert and is a spectator in the fuel vapor and air reaction that occurs in the catalytic reactor. The products of the catalytic reaction and nitrogen thus are all inert and can be returned to the fuel tank to create an inert environment in the ullage space of the fuel tank. Because water is undesirable in a fuel tank, most of the water is removed from the inert gas stream by a condenser before the remaining inert gas stream is returned to the fuel tank.

Although the ullage space in the fuel tank will almost always contain fuel vapor in some concentration, the amount of fuel vapor typically is below the so-called "lower flammability limit" (LFL) for tanks containing jet fuel or diesel fuel and above the "upper flammability limit" (UFL) for fuel tanks containing gasoline. When the fuel vapor concentration in the ullage space is below the LFL, an insufficient quantity of fuel vapor exists in the ullage space to sustain a fire. When the fuel vapor concentration is above the UFL, the amount of fuel vapor present in the ullage is too great to sustain a fire. Accordingly, when the fuel vapor concentration in the ullage space is either below the LFL or above the UFL, it is almost impossible to burn the ullage gas—even a lit match in the ullage space generally will not cause the ullage gas to burn. Fuels developed for automotive and aircraft applications are typically outside the so-called flammability window defined by the LFL and the UFL at typical operating temperatures, and thus fuel tank fires in both automobiles and aircraft occur highly infrequently, even in a post-crash environment.

Although the ullage space in an aircraft fuel tank containing Jet A fuel almost always contains a fuel concentration below the LFL, there are situations in which a sufficient quantity of fuel vapor can be liberated into the ullage space to create an unsafe condition. Fuel vapor concentrations above the LFL can occur when the temperature of the liquid fuel is sufficiently high. For nominal Jet A fuel, this temperature is approximately 100° F. at sea level atmospheric pressure. The temperature threshold is reduced at higher altitudes in which the amount of air in the ullage space is reduced to a point where the fuel vapor present is great enough to be above the LFL at that pressure condition. The temperature threshold may also become an issue more frequently in vehicle types in which liquid fuel temperatures tend to be higher. The objective of the CIS architecture is to create an inert atmosphere in the ullage space irrespective of the initial conditions in the ullage space at system start up. For those situations in which a flammable condition exists in the ullage space before the CIS is started, that same flammable mixture may exist inside the internal flow passages of the CIS as well.

In conventional configurations, flame arrestors are included in the system upstream and downstream of the catalytic reactor as well as upstream and downstream of the fuel tank to keep a flame front from exiting the reactor or entering the fuel tank. Although the inclusion of flame arrestors in conventional systems should provide sufficient and redundant protection against a flame front leaving the reactor and entering the fuel tank under most conditions, a system architecture which precludes a flammable condition that may exist inside the catalytic reactor from communicating with the fuel tank ullage space would be desirable to provide enhanced safety.

SUMMARY OF INVENTION

The present disclosure provides fuel system catalytic inerting system (CIS) architectures and methods of diluting the ullage gas entering the catalytic reactor with an inert or fuel-depleted gas flow. The resulting mixture of ullage and inert gas flows is not flammable and can be safely inputted into the catalytic reactor for catalytic reaction. The CIS architecture includes a bypass line that is placed across the ullage space, thereby bypassing or short-circuiting the fuel tank and allowing some of the inert gas exiting the catalytic reactor to be used as a diluent flow that is incorporated into the ullage gas drawn from the fuel tank upstream of the catalytic reactor. In addition to the bypass line, combinations of multiple check valves, flow control orifices, shut-off valves, and/or modulating valves are placed within the CIS system architecture to control the flow of gases. Flow of the inert and ullage gas streams can be controlled in a variety of ways using different types and combinations of such flow control components. The CIS architectures described herein permit more widespread use of such systems in applications in which such systems have not been substantially used previously, such as in vehicle fuel systems, and aircraft fuel systems in particular.

An aspect of the invention, therefore, is a catalytic inerting system (CIS) architecture that has a bypass line that can be employed to mix an inert flow with ullage gas from the fuel tank to avoid a flammable condition. In exemplary embodiments, the CIS architecture includes a fuel tank including a fuel tank inlet and a fuel tank outlet, the fuel tank defining a space for containing a liquid fuel and an ullage space above the liquid fuel containing an ullage gas. A catalytic reactor is in fluid communication with the fuel tank, the catalytic reactor having a catalytic inlet and a catalytic outlet, wherein the catalytic reactor receives an ullage gas flow from the fuel tank outlet and performs a catalytic reaction on the ullage gas to produce a more inert flow from the catalytic outlet to the fuel tank inlet. A bypass line provides a flow pathway between the fuel tank inlet and the fuel tank outlet, thereby bypassing the fuel tank, and a flow control mechanism controls relative flows of the inert flow from the catalytic outlet to the fuel tank inlet versus through the bypass line.

Another aspect of the invention is a method of controlling flow through the CIS architecture. In exemplary embodiments, the method includes the steps of: operating in a normal mode in which the bypass line is closed and the inert flow from the catalytic outlet is flowing into the ullage space through the fuel tank inlet and ullage gas flows out of the ullage space through the fuel tank outlet to the catalytic inlet; sensing an operating parameter within the CIS architecture; determining whether the operating parameter satisfies a first predetermined condition corresponding to a potential for a flammable condition; and when the first predetermined condition is satisfied, operating in a mixing mode in which the bypass line, fuel tank inlet, and fuel tank outlet are all open such that at least a portion of the inert flow from the catalytic outlet passes through the bypass line and mixes with ullage gas flowing from the fuel tank outlet.

The CIS architecture further may be operated in an isolation mode in which the fuel tank inlet and fuel tank outlet are closed on the fuel tank side of the bypass line, and the bypass line is open, such that the inert flow from the catalytic outlet is flowing only through the bypass line from the catalytic outlet and into the catalytic inlet, thereby completely isolating the fuel tank from the catalytic reactor. In exemplary embodiments, the isolation mode may be part of a startup mode in which the system is operated initially in the isolation mode upon startup, and/or the isolation mode may be part of a shutdown mode in which the system is not operated in the isolation mode as part of a shutdown process.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
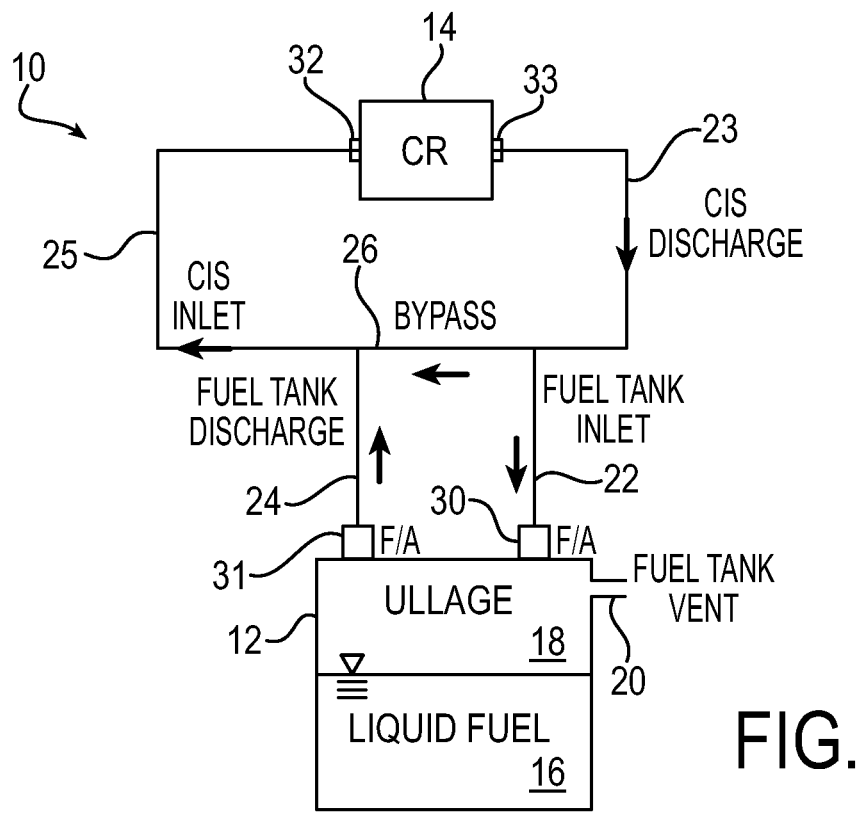
FIG. 1 is a drawing depicting an exemplary generalized catalytic inerting system (CIS) architecture that may be a portion of an overall vehicle fuel system.

Embodiments of the present invention will now be described with reference to the drawings, wherein like reference numerals are used to refer to like elements throughout. It will be understood that the figures are not necessarily to scale.

Generally, an aspect of the invention is a catalytic inerting system (CIS) architecture that has a bypass line that can be employed to mix an inert flow with ullage gas from the fuel tank to avoid a flammable condition. In exemplary embodiments, the CIS architecture includes a fuel tank including a fuel tank inlet and a fuel tank outlet, the fuel tank defining a space for containing a liquid fuel and an ullage space above the liquid fuel containing an ullage gas. A catalytic reactor is in fluid communication with the fuel tank, the catalytic reactor having a catalytic inlet and a catalytic outlet, wherein the catalytic reactor receives an ullage gas flow from the fuel tank outlet and performs a catalytic reaction on the ullage gas to produce a more inert flow from the catalytic outlet to the fuel tank inlet. A bypass line provides a flow pathway between the fuel tank inlet and the fuel tank outlet, thereby bypassing the fuel tank, and a flow control mechanism controls relative flows of the inert flow from the catalytic outlet to the fuel tank inlet versus through the bypass line.

FIG. 1 is a drawing depicting an exemplary catalytic inerting system (CIS) architecture 10 that may be a portion of an overall vehicle fuel system. The CIS architecture 10 may include a fuel tank 12 that is in fluid communication with catalytic reactor 14. The fuel tank 12 defines a space such that a portion of the fuel tank 12 contains a liquid fuel 16, which typically does not fill the entire fuel tank. In addition, therefore, the fuel tank defines an ullage space 18 above the liquid fuel, in which an ullage gas is present. As referenced above, the ullage gas is an air and fuel vapor mixture that exists over the top of the liquid fuel in a fuel tank. Similarly as in conventional CIS architectures, the ullage gas is recirculated, with the ullage gas being drawn from the fuel tank and reacted in the catalytic reactor 14. The catalytic process causes oxygen and fuel vapor present in the ullage gas to chemically react and produce relatively inert chemical species, namely carbon dioxide and water vapor, which is mixed with inert nitrogen present in the air to produce an inert output flow. The water vapor may be removed from the inert flow by a condenser (not shown) as is conventional. The fuel tank 12 further may include a fuel tank vent 20 that may be employed as a pressure release to avoid excessive pressure buildup within the fuel tank.

The CIS architecture 10 further may include a fuel tank inlet 22 and a fuel tank outlet 24. The fuel tank outlet 24 leads to a catalytic inlet 25 to provide a pathway for discharge of ullage gas from the fuel tank 12 and into the catalytic reactor 14. The fuel tank inlet 22 provides a pathway for the discharge flow of the relatively inert gas stream from the catalytic reactor 14 through a catalytic outlet 23 for re-circulation back into the fuel tank 12. In this manner, the concentration of oxygen within the ullage gas is substantially eliminated to prevent the potential for a flammable condition. The CIS architecture 10 further includes a bypass line 26 that is operable to provide fluid communication between the fuel tank inlet 22 to the fuel tank outlet 24 in a manner that bypasses the fuel tank 12. Generally, the bypass line 26 permits the relatively inert gas stream that has been outputted from the catalytic reactor 14 via the catalytic outlet 23 to be inputted into the discharged ullage gas from the fuel tank for flow to the catalytic inlet 25. By mixing the inert flow with the discharged ullage gas, a concentration of fuel vapor and oxygen in the ullage gas is reduced prior to the ullage gas entering the catalytic reactor 14.

For additional protection from fire, the system 10 further may include a plurality of flame arrestors located at various parts of the system as are known in the art for restricting any flame front from moving through the system, and particularly out from the catalytic reactor and into the fuel tank. For example, flame arrestors 30 and 31 may be provided respectively on the inlet and outlet sides of the fuel tank, and/or flame arrestors 32 and 33 may be provided respectively on the inlet and outlet sides of the catalytic reactor 14.

Accordingly, the CIS architecture 10 provides a system and methods of diluting the ullage gas entering the catalytic reactor 14 with an inert or fuel-depleted gas flow that flows from the catalytic reactor through the bypass line 26. The resulting mixture of ullage and inert gas flows is not flammable and can be safely inputted into the catalytic reactor 14 for further catalytic reaction. The bypass line 26 is placed across the ullage space between the fuel tank inlet 22 and the fuel tank outlet 24, thereby allowing some of the inert gas exiting the catalytic reactor from the catalytic outlet 23 to be used as a diluent flow that is incorporated into the ullage gas drawn from the fuel tank which flows through the catalytic reactor inlet 25. In addition to the bypass line, check valves, flow control orifices, shut-off valves, and/or modulating valves are placed within the fuel system architecture to control the flow of gases. Embodiments containing various configurations of flow control mechanisms are described below with respect to subsequent figures.

In exemplary embodiments, the CIS architecture 10 including the bypass line 26 can operate in at least three different modes. In a first mode of operation, also referred to as the "normal mode", the bypass line is closed and is not flowing any gas. All gas discharged from the catalytic reactor is therefore flowing into the ullage space through the fuel tank inlet and out of the ullage space through the fuel tank outlet. The normal mode is the principal mode of operation and is employed typically when the ullage gas is under conditions that are unable to result in a fire. Accordingly, the system architecture operates similarly as in conventional configurations during periods of operation in which a flammable condition is not present, such as for example when the fuel temperature is less than the temperature associated with the lower flammability limit (LFL), e.g., 100° F. for typical aircraft jet fuel and conditions of fuel vapor concentration. The system will continue to operate in the normal mode until such time as the system determines that the potential for a flammable condition has arisen.

In the event a potential arises for a flammable condition, for example if the fuel temperature rises above the temperature associated with the LFL fuel vapor concentration being above a safe level, the system architecture may be switched from the normal mode to a second mode that operates to eliminate such potential for fire. In a second mode of operation, also referred to as the "mixing mode", the bypass line, fuel tank inlet, and fuel tank outlet are all open and flowing gas. Accordingly, at least a portion of inert gas flowing from the output of the catalytic reactor passes through the bypass line and mixes with ullage gas discharged and flowing from the fuel tank outlet. This mixed gas then continues into the catalytic reactor inlet for catalytic reaction. By using the bypass line to mix the inert and ullage gases, the fuel vapor concentration of the gas flow entering the catalytic reactor is reduced, thereby eliminating the propensity for a flammable condition.

The mixing mode may be exited and operation returned to the normal mode upon satisfaction of a predetermined condition. For example, the system may exit the mixing mode and be returned to the normal mode after a predetermined amount of time based on a speed of tank inerting, upon a measured concentration of fuel vapor in the ullage gas falling below a predetermined safe concentration, upon a measured temperature falling below some threshold temperature such as falling below the temperature associated with the LFL, or upon a measured ullage oxygen concentration falling below a predetermined safe concentration. Any suitable conditions may be employed for switching between the normal mode and the mixing mode, and such conditions may be applied individually or in any suitable combination. In addition, pertinent threshold conditions, such as for example fuel vapor concentration and temperature conditions, may be the same for triggering a switch between the normal and mixing modes in either direction, or may be different for triggering a switch from the normal mode to the mixing mode as compared to switching from the mixing mode to the normal mode.

In a third mode of operation, also referred to as the "isolation mode", the fuel tank inlet and fuel tank outlet are closed on a fuel tank side of the bypass line and thus and are not flowing any gas, and the bypass line is open. Accordingly, all gas discharged from the catalytic reactor is flowing through the bypass line from the catalytic outlet 23 and into the catalytic input 25, thereby completely isolating the fuel tank 12 from the catalytic reactor 14.

The isolation mode may be employed during system startup. The system may remain in isolation mode during catalytic reactor warmup to perform an initial inerting phase. Any residual fuel left in the bypass loop will be consumed during this isolation mode inerting phase, which may last for a predetermined amount of time or until the catalytic reactor reaches a minimum operating temperature. When the catalytic reactor has reached such minimum temperature, the recirculation flow starts by controlling the system to enter the normal mode. The isolation mode also may be employed during system shutdown. For example, after aircraft flight and before system shutdown when the catalytic reactor is still warm, the isolation mode performs a post-flight isolation loop inerting phase. Similarly to the initial inerting phase on startup, the post-flight inerting phase consumes fuel left in the bypass loop to ensure the system is shut down in a safe condition, i.e., with the tank isolated and the bypass loop inert.

FIGS. 2 and 5-10 are drawings depicting variations of embodiments of the general system architecture 10 containing various configurations of flow control mechanisms, which are described below with respect to subsequent figures. Accordingly, like reference numerals are used to identify like components in FIGS. 2 and 5-10 as are present in FIG. 1. Generally, in addition to the bypass line 26, check valves, flow control orifices, shut-off valves, and/or modulating valves are placed within the system architecture to control the flow of gases. A check valve is a passive valve that allows flow in one direction only and operates in response to one or more predetermined conditions, such as for example pressure/flow conditions; a flow control orifice is an orifice that has a single fixed flow area that may be employed to restrict flow in a constant manner; a non-modulating shut-off valve has a fixed flow area in the open position and zero flow area in the closed position; and a modulating shutoff valve has a continuously variable flow area from zero to some maximum flow value.

Flow of the inert flow and ullage gas stream can be controlled in a variety of ways using different types and combinations of such flow control components for operation in the normal, mixing, and isolation modes described above. In exemplary embodiments, a flow control mechanism for the CIS architecture includes a flow control component in one or more of the fuel tank outlet, fuel tank inlet, and bypass line. In other exemplary embodiments, the flow control mechanism for the CIS architecture includes a flow control component in all three of the fuel tank inlet, fuel tank outlet, and the bypass line.

The differences among the various embodiments and configurations of the flow control mechanism result in tradeoffs as to complexity, expense, and level or scope of flow control. Generally, more complex variable control valve mechanisms may be employed to permit a greater a degree of flow control through the various flow paths of the system, and may reduce the overall number of components needed in the system. Such systems, however, would in turn require more complex control components, such as for example sensors, control electronics, and flow control software, and individual variable control components are generally more complex and expensive than analogous fixed flow control components. Simple fixed flow control components also do not require as sophisticated control systems as comparted to variable flow control components. The degree of flow control, however, is reduced for systems utilizing fixed flow control components. Accordingly, the valve and other flow control components described with respect to the different embodiments may be combined in any suitable manner as warranted for a given application.

Figure 2:
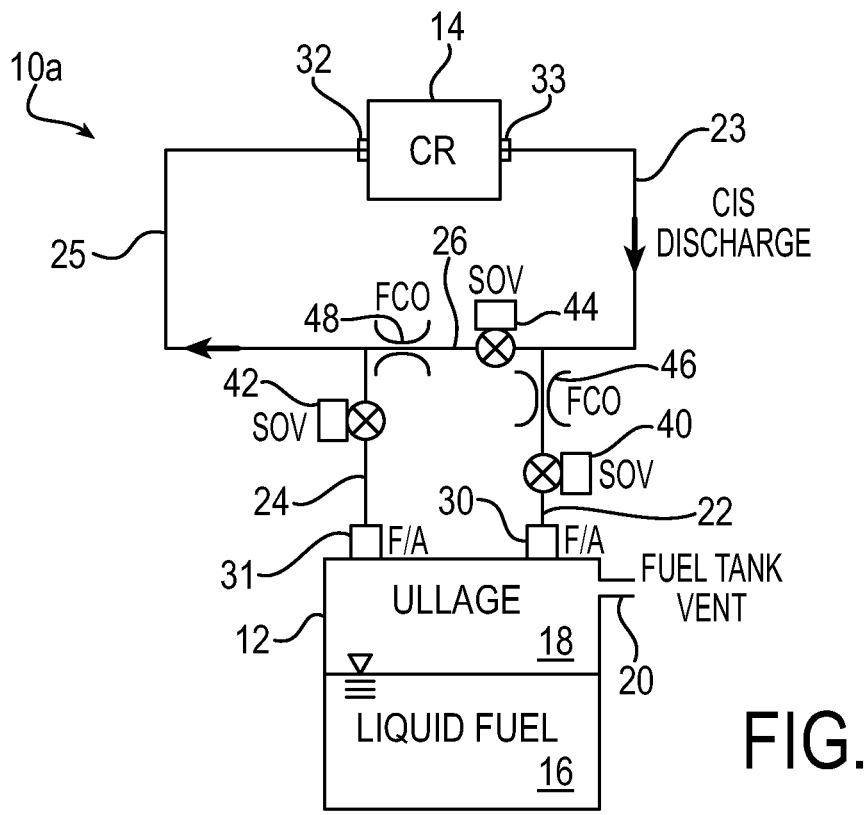
FIG. 2 and FIG. 2A are drawings depicting another exemplary catalytic inerting system (CIS) architecture, employing multiple shutoff valves and orifices for flow control.

FIG. 2 is a drawing depicting another exemplary catalytic inerting system (CIS) architecture 10a. In this example, three non-modulating shutoff valves independently control the system, in combination with two flow control orifices that control the gas flow into the fuel tank and across the bypass line. This embodiment has significant effectiveness with simplicity of construction. The non-modulating shutoff valves are simple to control, and with three such valves the three modes of operation (normal mode, mixing mode, and isolation mode) are readily achieved. A significant parameter of the system is referred to as the "bypass flow ratio", which is the ratio of bypass flow/fuel tank inlet flow. In this example, the bypass flow ratio is preset at the time of design by the selection of the particular flow control orifice areas. However, because the flow control orifices are fixed, the bypass flow ratio is fixed at the time of the design and generally cannot be changed during operation.

Referring to FIG. 2, the CIS architecture 10a employs a fuel tank inlet shutoff valve 40, a fuel tank outlet shutoff valve 42, and a bypass shutoff valve 44, which all are non-modulating shutoff valves. The CIS architecture 10a further employs a fuel tank inlet flow control orifice 46 and a bypass flow control orifice 48. With the shutoff valves in the open state, the bypass flow and the fuel tank inlet flow, and therefore the bypass flow ratio, is set at the time of construction by the relative sizes of the orifices of the flow control orifices 46 and 48. The bypass flow ratio, therefore remains fixed and cannot be changed during operation.

To place the system 10a in normal mode, the bypass shutoff valve 44 is closed to prevent the bypass flow, and the fuel tank inlet shutoff valve 40 and fuel tank outlet shutoff valve 42 are open to permit the recirculating flow through the catalytic reactor 14. To switch the system 10a into the mixing mode, the bypass shutoff valve 44 is opened to permit the additional flow of inert gas across the bypass line 26. To switch the system 10a into the isolation mode, the bypass shutoff valve 44 is opened to permit the bypass flow, and the fuel tank inlet shutoff valve 40 and fuel tank outlet shutoff valve 42 are closed to preclude flow into and out from the fuel tank 12. Accordingly, the recirculating flow through the catalytic reactor 14 is solely across a bypass loop through the bypass line 26.

Figure 3:
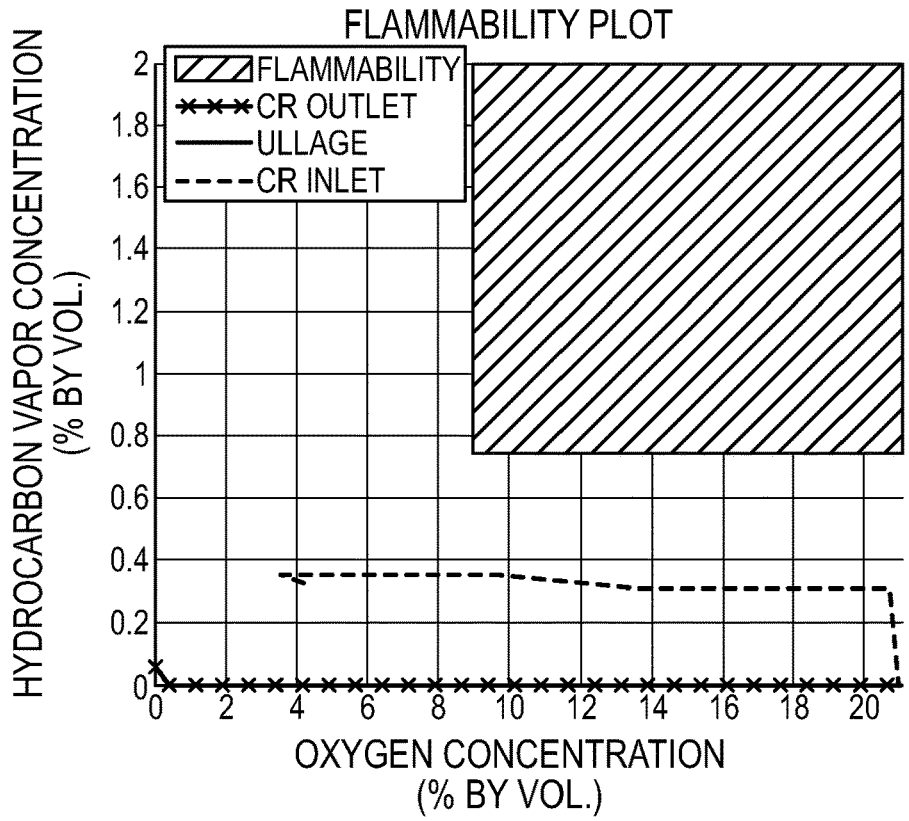
FIG. 3 is a graphical drawing depicting simulation results for performance of the exemplary embodiment of the CIS architecture of FIG. 2 under a first temperature condition.
Figure 4:
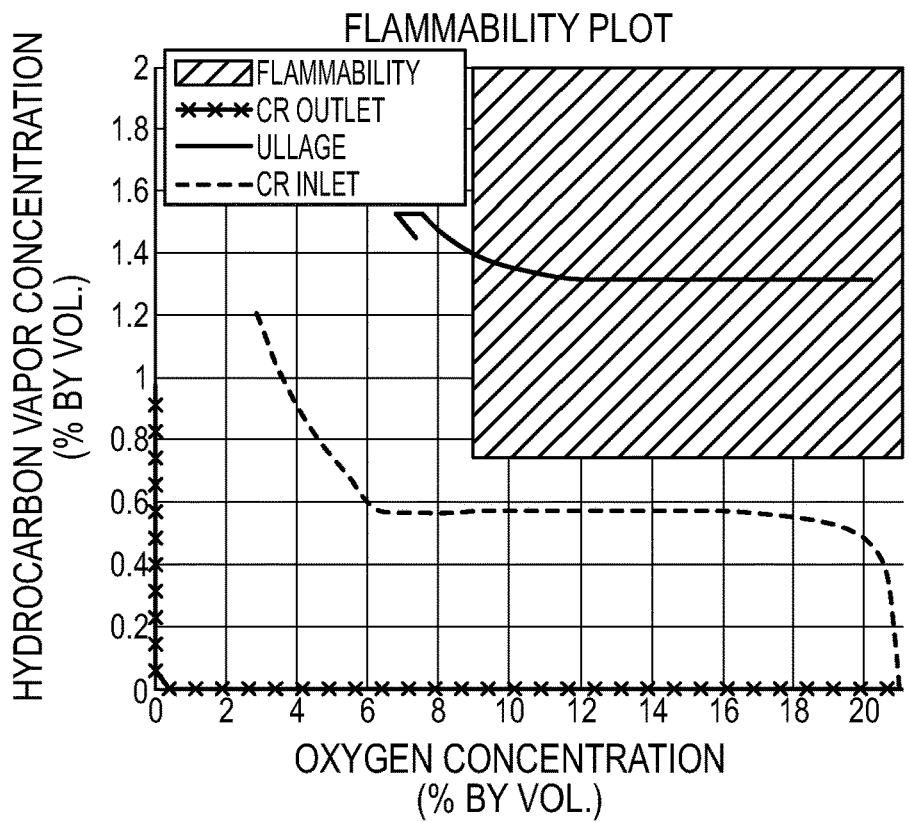
FIG. 4 is a graphical drawing depicting simulation results for performance of the exemplary embodiment of the CIS architecture of FIG. 2 under a second temperature condition.

FIGS. 3 and 4 are graphical drawings depicting simulation results for performance of the exemplary embodiment of CIS architecture 10a of FIG. 2. The CIS architecture 10a was modeled with the simulation results shown in the figures. In each of FIGS. 3 and 4, the mixture of oxygen concentration (x-axis) and fuel concentration (y-axis) that produces a flammable environment is shown as a solid box. Simulations for Jet A fuel at two fuel temperatures, 68° F. (FIGS. 3) and 122° F. (FIG. 4), are shown. As depicted in the figures, the CIS architecture 10a provides a catalytic reactor inlet mixture (dashed line) that is always outside the flammability zone, even when the ullage (solid line) is flammable. When the fuel is relatively cool as shown in FIG. 3, there is not enough fuel vapor to produce a flammable ullage so there is no bypass flow needed. Accordingly, the system will operate in the normal mode and the catalytic reactor inlet and ullage mixtures are largely equal with any excess fuel vapor being rendered inert by the catalytic reaction. When the fuel is hot and the ullage is flammable as shown in FIG. 4, the system will operate in the mixing mode and allow some inert bypass flow to mix with the fuel tank outlet flow, and therefore provide a catalytic reactor inlet mixture that is not flammable.

Figure 2A:
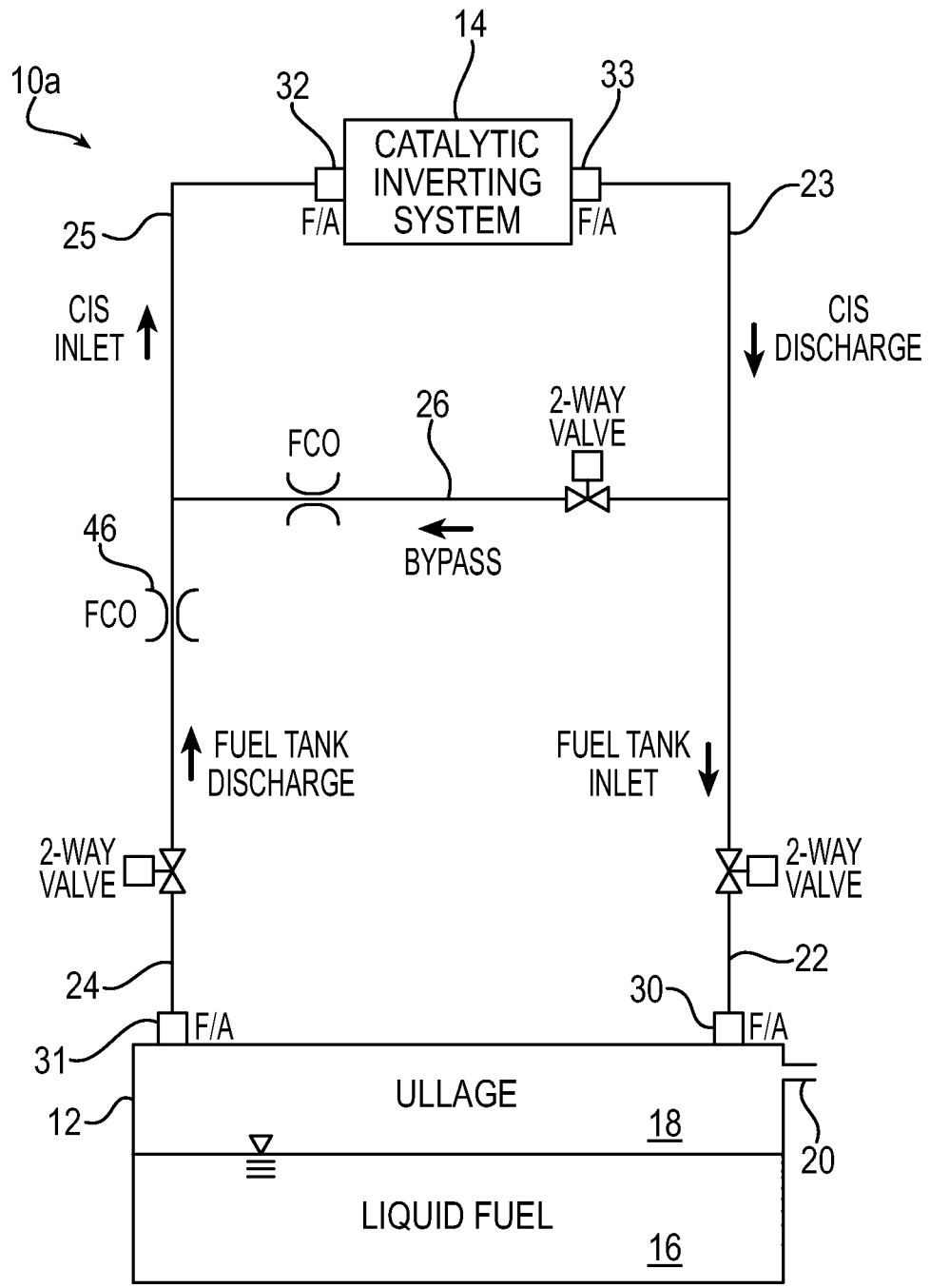

The remaining figures provide alternative configurations of the CIS architecture, particularly as relating to the configurations and combinations of the components of the flow control mechanism. For example, FIG. 2A is a variation on the embodiment of FIG. 2, in which the flow control orifice 46 is located on the fuel tank outlet side of the system.

Figure 5:
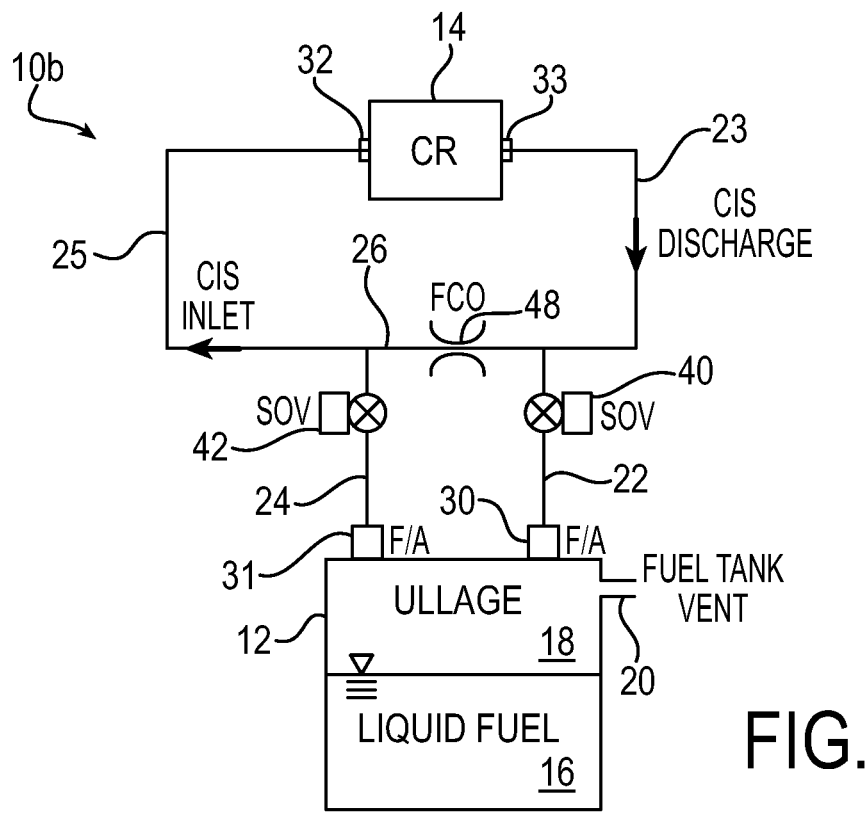
FIG. 5 is a drawing depicting another exemplary catalytic inerting system (CIS) architecture similar to FIG. 2, except employing a flow control orifice in the bypass line for bypass flow control.

FIG. 5 is a drawing depicting another exemplary catalytic inerting system (CIS) architecture 10b. In this example, similarly to the previous example, two non-modulating shutoff valves are located in the fuel tank inlet (fuel tank inlet shutoff valve 40) and fuel tank outlet (fuel tank outlet shutoff valve 42). The bypass flow control orifice 48 also is present in the bypass line 26 to continuously meter the bypass flow, but the third bypass shutoff valve 44 and the fuel tank inlet flow control orifice 46 are absent in this example. In this example, therefore, more simplified construction is achieved by reducing number of components as compared to the example of FIG. 2. The bypass flow ratio is preset at the time of design by the selection of the particular flow control orifice area of element 48, and again the bypass flow ratio is fixed at the time of the design and generally cannot be changed during operation.

Although there are fewer components in the example system 10b, there is always a bypass flow in this example which can reduce the inerting system's efficiency. Accordingly, there is no distinct normal mode separate from the mixing mode in which the bypass is closed off as can be achieved in the previous embodiment. Rather, in this example there is always a flow through the bypass line 26. In the example system 10b, to switch the system into the isolation mode, similarly as in the previous embodiment 10a the fuel tank inlet shutoff valve 40 and fuel tank outlet shutoff valve 42 are closed to preclude flow into and out from the fuel tank 12. Accordingly, the recirculating flow through the catalytic reactor 14 is solely across the bypass loop through the bypass line 26 including the bypass flow control orifice 48.

Figure 6:
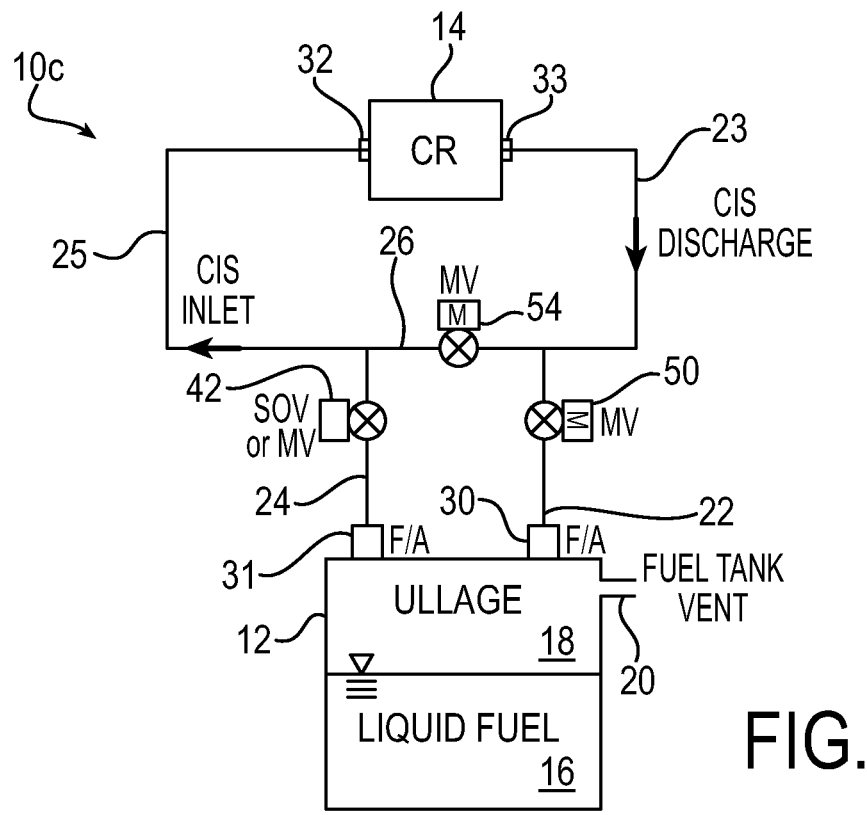
FIG. 6, FIG. 6A, FIG. 6B, FIG. 6C, FIG. 6D, and FIG. 6E are drawings depicting additional exemplary catalytic inerting system (CIS) architectures, employing at least one modulating valve for flow control.

FIG. 6 is a drawing depicting another exemplary catalytic inerting system (CIS) architecture 10c. In this example, two modulating shutoff valves are provided, with one being located in the fuel tank inlet line to control the inert gas flow into the fuel tank, and a second modulating shutoff valve to control the gas flow through the bypass line. A simple non-modulating shutoff valve may be provided in the fuel tank outlet to permit quick isolation of the fuel tank from the remainder of the system for the isolation mode. By using the modulating valves in the bypass line and the fuel tank inlet, the bypass flow ratio is variable during operation by variably adjusting the flows. Inerting performance therefore can be maximized when utilizing the bypass line is required. However, modulating valves introduce more complexity in the control system and can be more expensive as individual components than simple non-modulating shutoff valves.

Referring to FIG. 6, the CIS architecture 10c employs a modulating fuel tank inlet shutoff valve 50, the non-modulating fuel tank outlet shutoff valve 42 comparably as in previous embodiments, and a modulating bypass shutoff valve 54. With the use of modulating shutoff valves in the bypass line and fuel tank inlet, additional flow control orifices are not required, and the bypass flow ratio is variable during operation in that the modulating shutoff valves 50 and 54 can provide a variable flow respectively to the fuel tank inlet 20 and through the bypass line 26. In another variation of this example, all three shutoff valves may be modulating shutoff valves, i.e., valve 42 also is a modulating shutoff valve, to permit variable flow control through all lines of the system.

To place the system 10c in normal mode, the modulating bypass shutoff valve 54 is closed fully to prevent the bypass flow, and the modulating fuel tank inlet shutoff valve 50 and the non-modulating fuel tank outlet shutoff valve 42 (or additional modulating valve) are open to permit the recirculating flow through the catalytic reactor 14. To switch the system 10c into the mixing mode, the modulating bypass shutoff valve 54 is opened to permit the additional flow of inert gas across the bypass line 26. Again, the bypass flow ratio can be variably controlled by controlling flow levels through the modulating shutoff valves 50 and 54. To switch the system 10c into the isolation mode, the modulating bypass shutoff valve 54 is opened to permit the bypass flow, and the modulating fuel tank inlet shutoff valve 50 and fuel tank outlet shutoff valve 42 are closed to preclude flow into and out from the fuel tank 12. Accordingly, the recirculating flow through the catalytic reactor 14 is solely across the bypass loop through the bypass line 26.

Figure 6A:
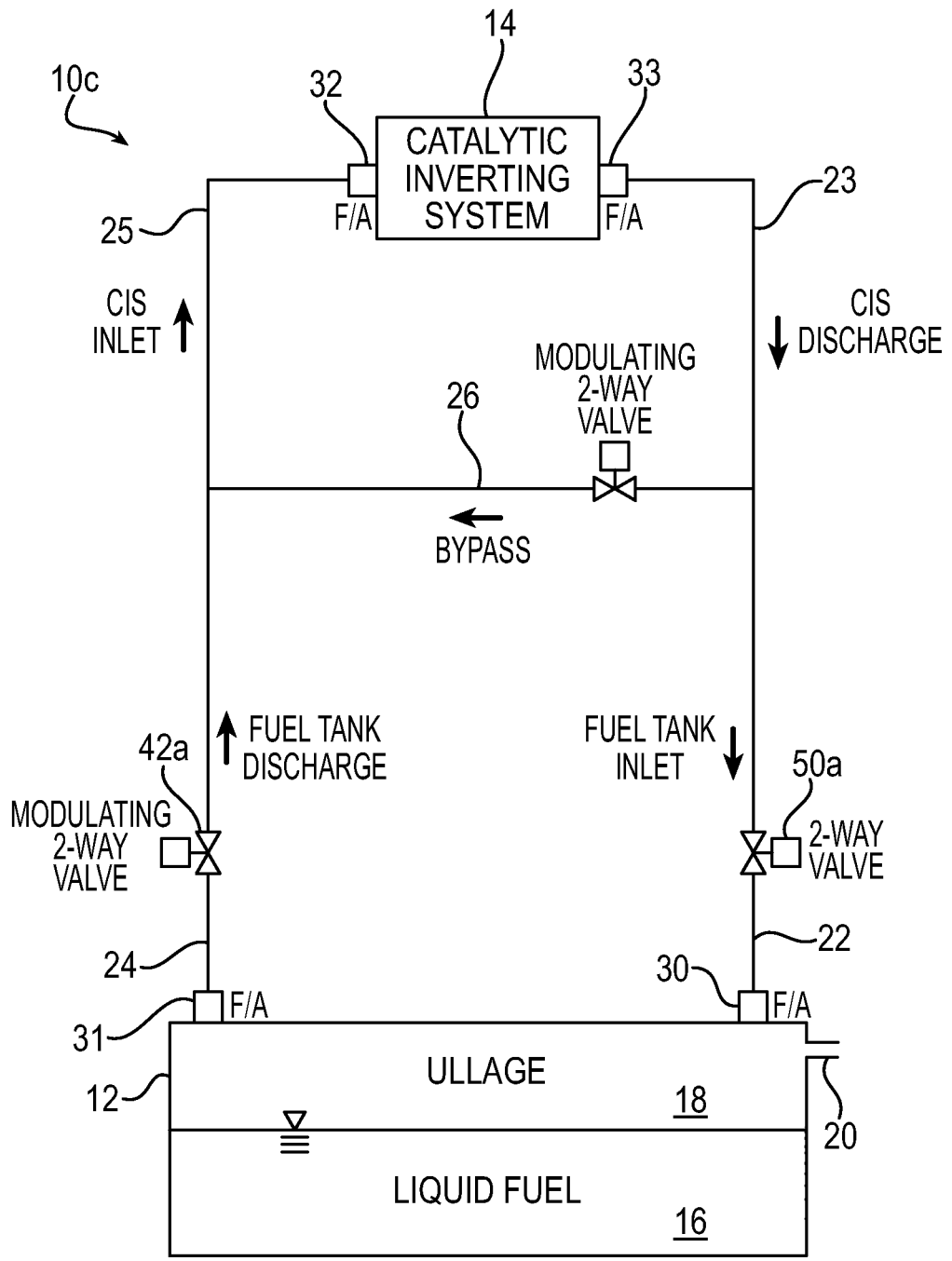
Figure 6B:
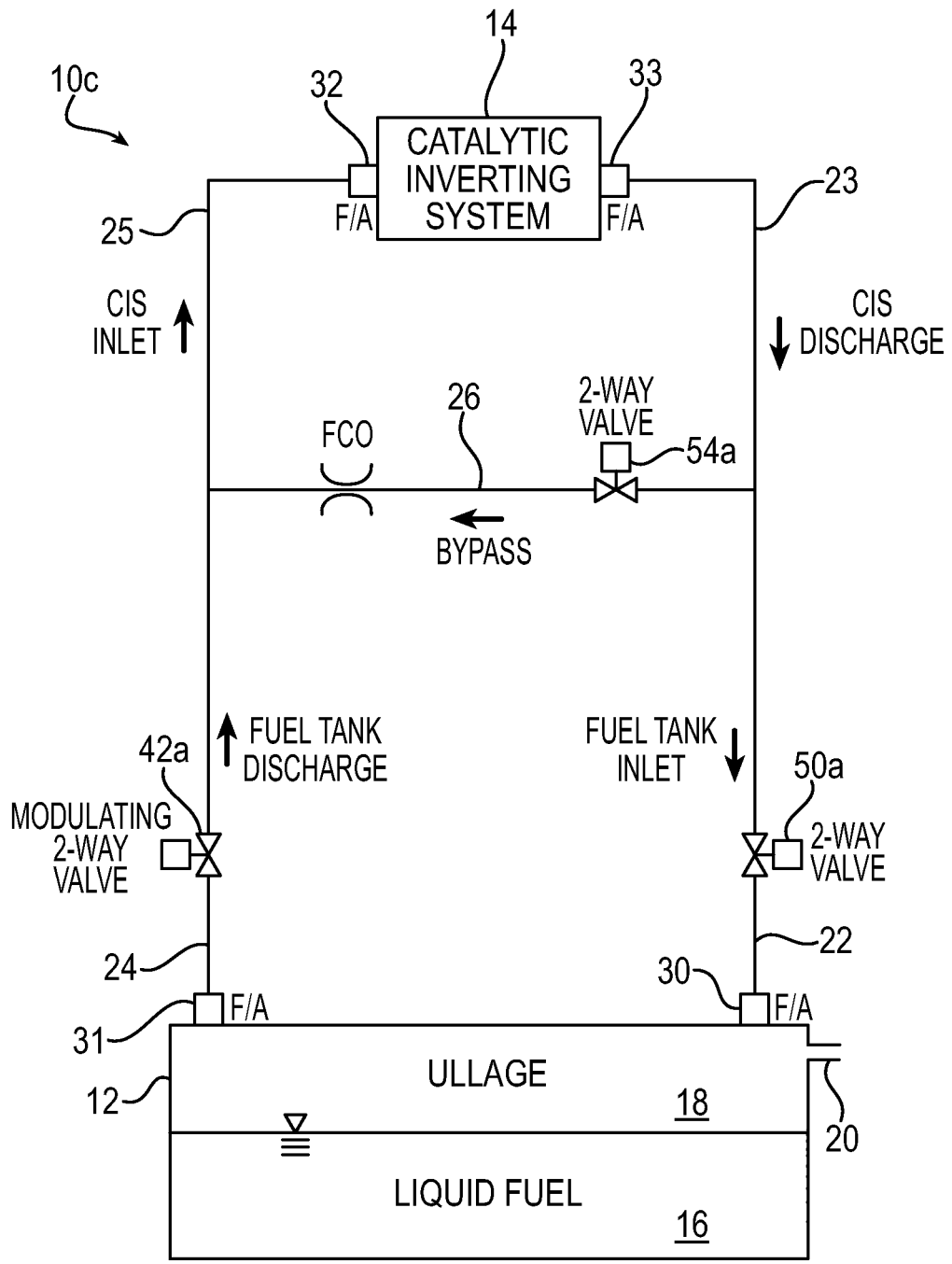
Figure 6C:
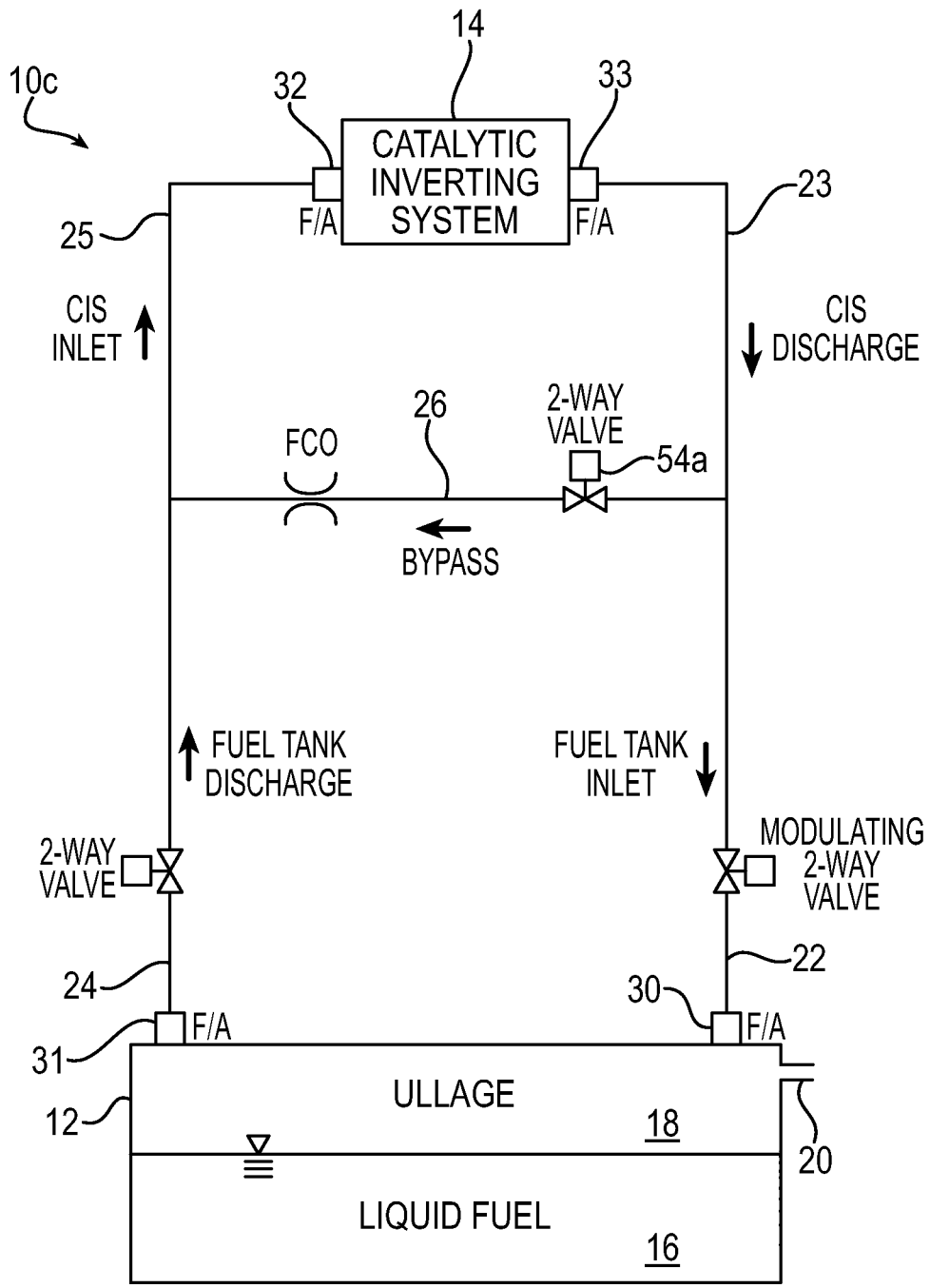
Figure 6D:
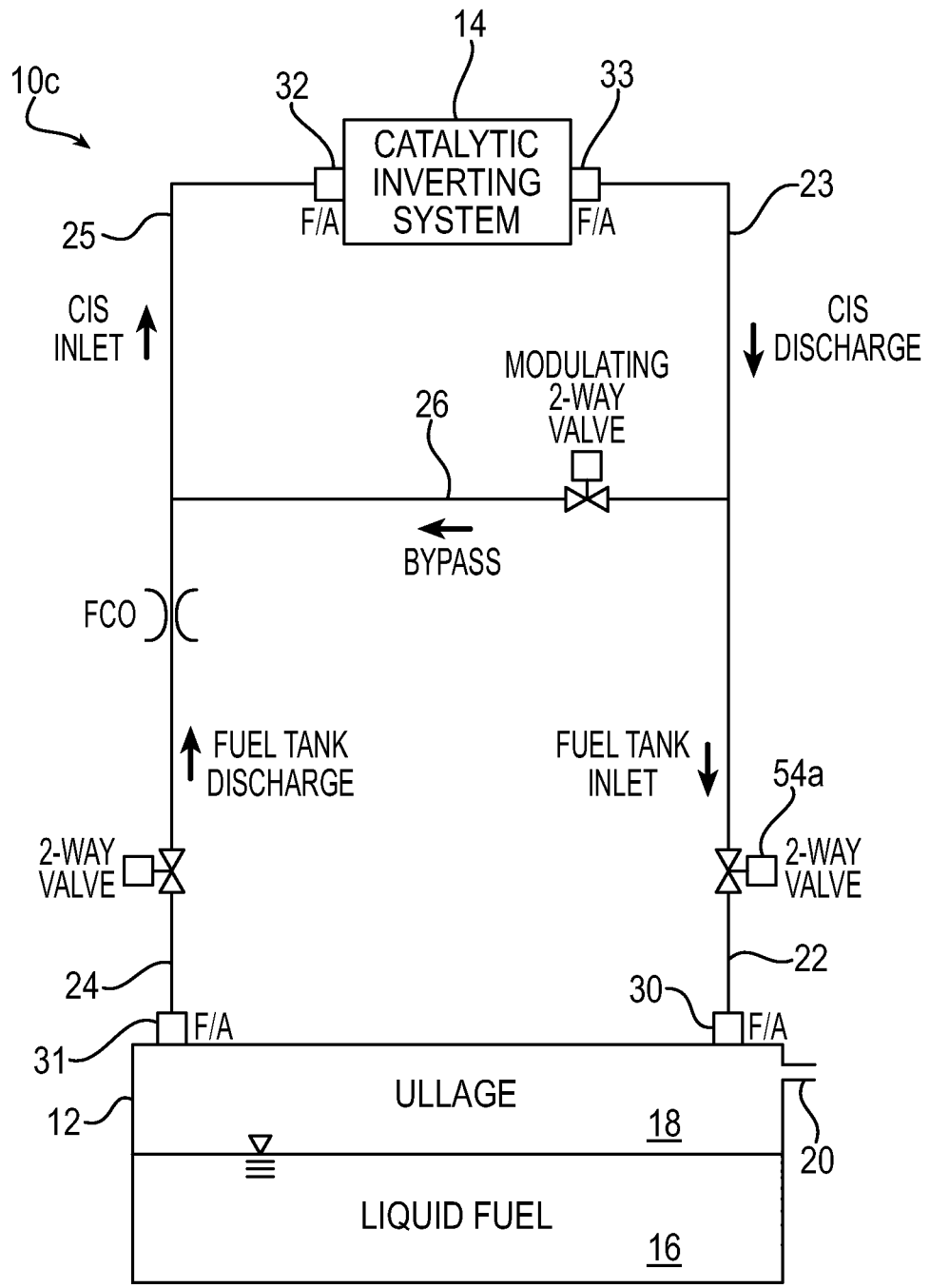
Figure 6E:
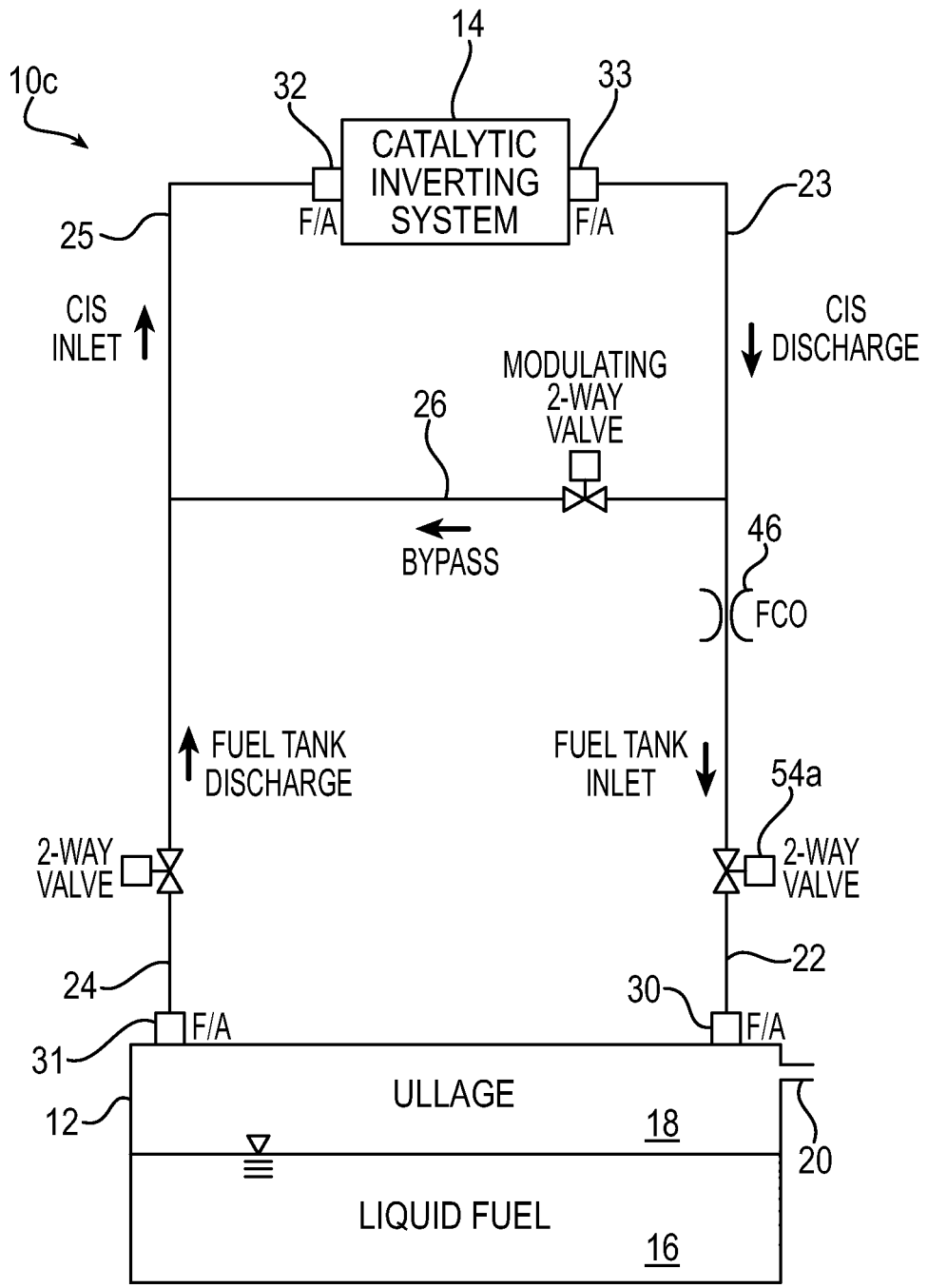

FIGS. 6A-6E are variations on the embodiment of FIG. 6, in which the specific configuration of the system is altered in one or more ways. In the embodiment of FIG. 6A, the modulating fuel tank inlet shutoff valve 50 instead is configured as a non-modulating two-way shutoff valve 50a. In addition, the outlet shutoff valve 42 instead is configured as a modulating shutoff valve 42a. The embodiment is FIG. 6B is comparable to that of FIG. 6A, with additionally the modulating shutoff valve 54 being configured as a non-modulating two-way shutoff valve 54a and the inclusion of a flow control orifice in the bypass line. FIG. 6C depicts a variation of FIG. 6 in which only the modulating shutoff valve 54 is altered to a non-modulating two-way shutoff valve 54a. FIG. 6D depicts a variation of FIG. 6 in which only the modulating shutoff valve 50 is altered to a non-modulating two-way shutoff valve 54a and the inclusion of a flow control orifice in the tank discharge line. FIG. 6E depicts a variation of FIG. 6D in which the flow control orifice 46 is provided on the fuel tank inlet side.

Figure 7:
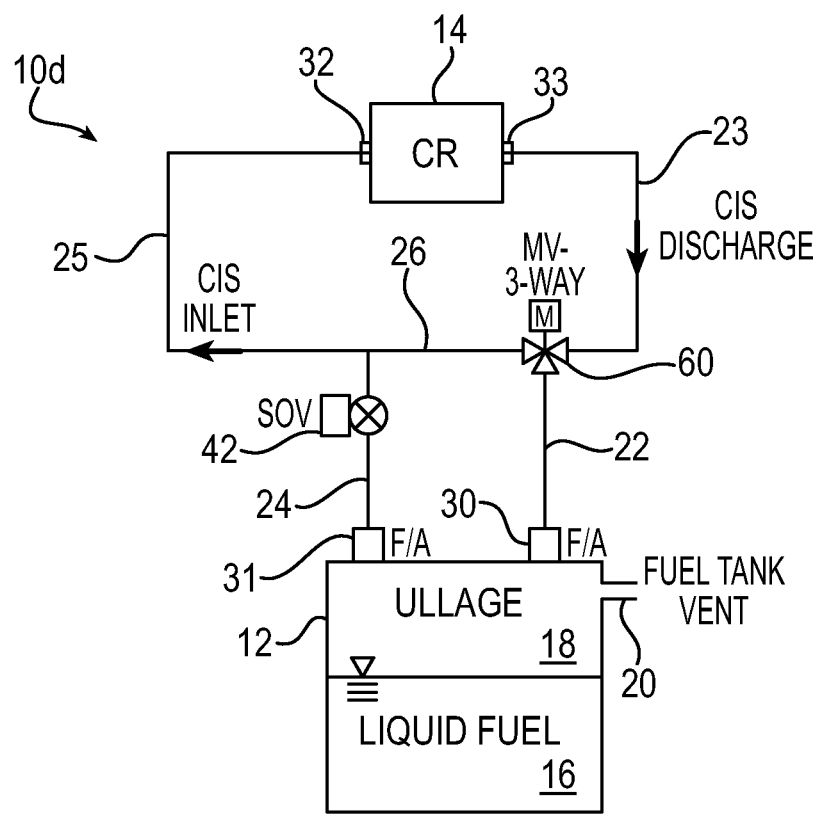
FIG. 7, FIG. 7A, and FIG. 7B are drawings depicting additional exemplary catalytic inerting system (CIS) architectures, employing a 3-way valve connecting the CIS discharge line, the fuel tank inlet line and the bypass line in combination with a shutoff valve for flow control.

FIG. 7 is a drawing depicting another exemplary catalytic inerting system (CIS) architecture 10d. In this example, a modulating 3-way valve is incorporated at the intersection between the fuel tank inlet and the bypass line for controlling the flow into the fuel tank and across the bypass line. Using the modulating 3-way valve has advantages in that the bypass flow ratio is variable during operation, and inerting performance can be maximized when the bypass flow is required. The use of a 3-way valve also reduces the total number of components by combining flow control through the bypass line and fuel tank inlet with a single component, providing a greater degree of control with fewer components. 3-way modulating valves, however, require more complexity in the control system and can be expensive as individual components, and may need to be a custom component designed for a particular application or system.

Referring to FIG. 7, in this example the CIS architecture 10d includes a modulating 3-way valve 60 that is incorporated at the intersection between the fuel tank inlet 22 and the bypass line 26 for controlling the flow into the fuel tank and across the bypass line. This embodiment further includes the non-modulating fuel tank outlet shutoff valve 42 similarly as in some of the previous embodiments, which is located at the fuel tank outlet 24 and is operable to quickly isolate the fuel tank from the remainder of the system for operating in the isolation mode.

To place the system 10d in normal mode, the 3-way modulating valve 60 closes off the flow path through the bypass line 26 to prevent the bypass flow, but is open to permit flow from the catalytic outlet 23 into the fuel tank inlet 22. In addition, the non-modulating fuel tank outlet shutoff valve 42 is open to permit the recirculating flow through the catalytic reactor 14. To switch the system 10d into the mixing mode, the 3-way modulating valve 60 further is opened to permit the additional flow of inert gas across the bypass line 26. Again, the bypass flow ratio can be variably controlled by controlling flow levels through the 3-way modulating valve in both flow directions through the bypass line 26 and into the fuel tank inlet 22. To switch the system 10d into the isolation mode, the 3-way modulating valve 60 is opened to permit the bypass flow while being closed as to flow to the fuel tank inlet 22, and the fuel tank outlet shutoff valve 42 also is closed. Such valve states preclude flow into and out from the fuel tank 12. Accordingly, the recirculating flow through the catalytic reactor 14 is solely across the bypass loop through the bypass line 26.

Figure 7A:
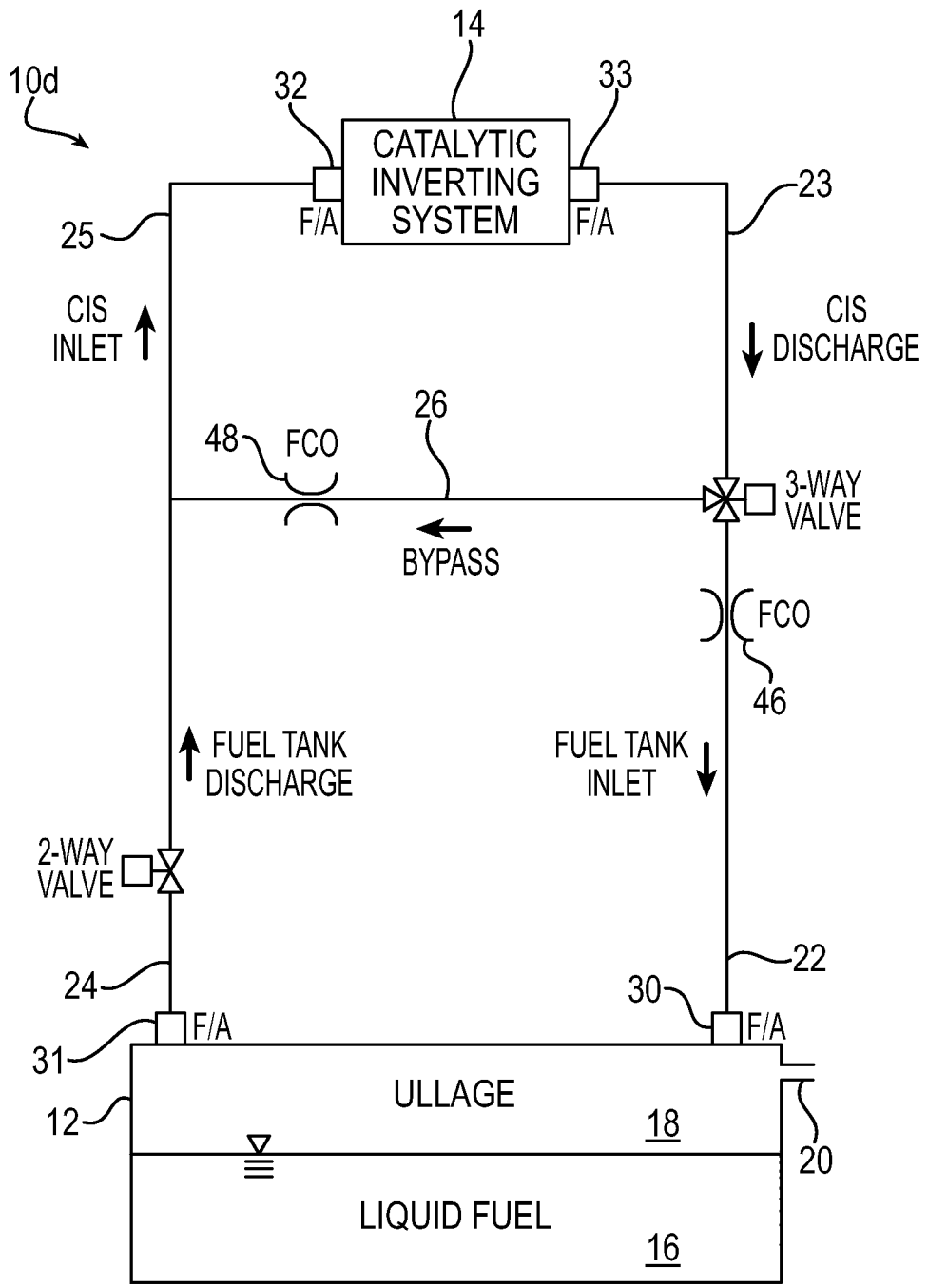
Figure 7B:
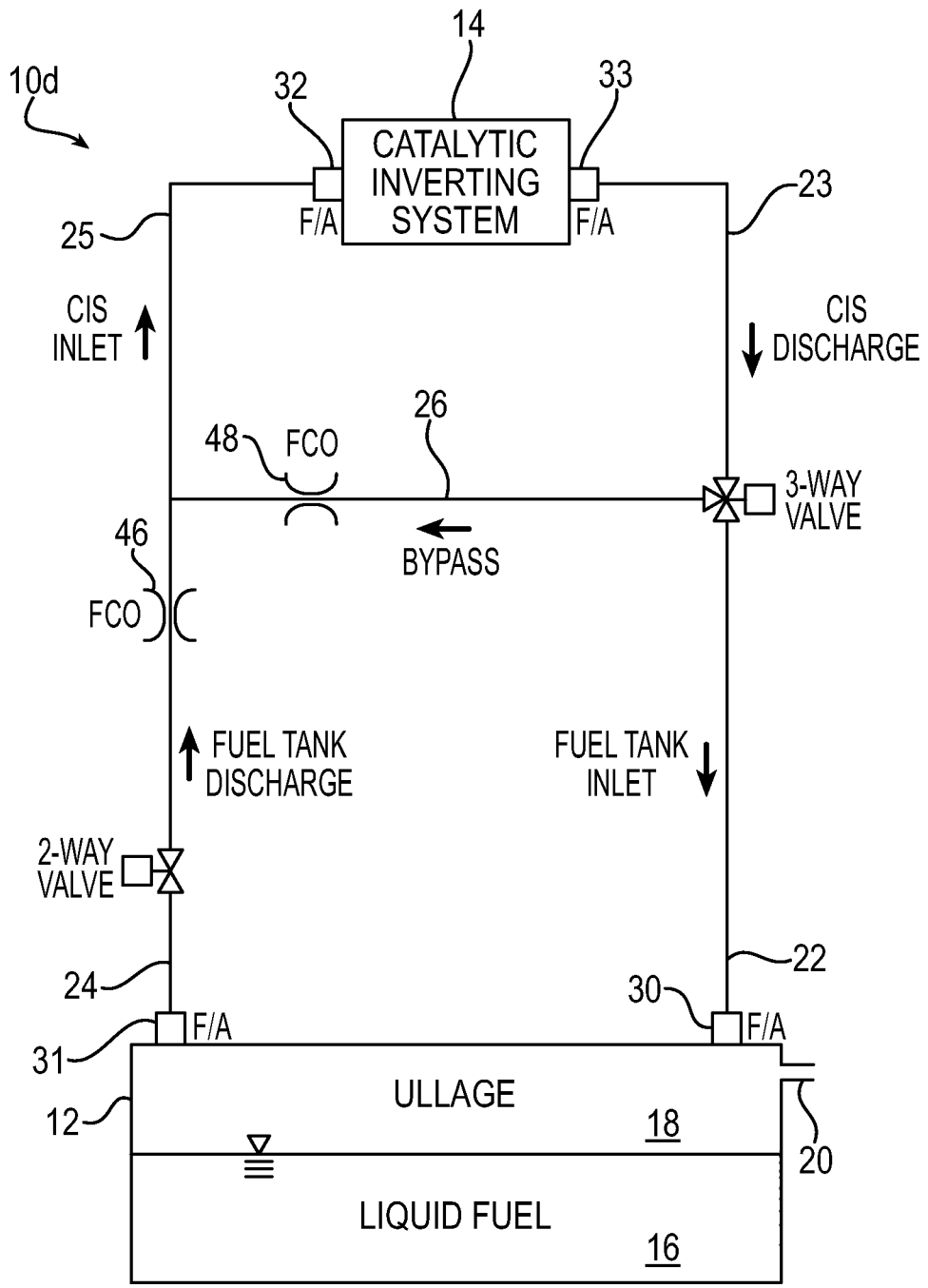

FIGS. 7A-7B are variations on the embodiment of FIG. 7, in which the specific configuration of the system is altered in one or more ways. In both FIGS. 7A and 7B, the modulating 3-way valve is replaced with a non-modulating 3-way valve. The embodiment of FIG. 7A further includes the fuel tank inlet flow control orifice 46 and the bypass flow control orifice 48 that are present in other embodiments. In the embodiment of FIG. 7B, the flow control orifice 46 is provided on the fuel tank outlet side.

Figure 8:
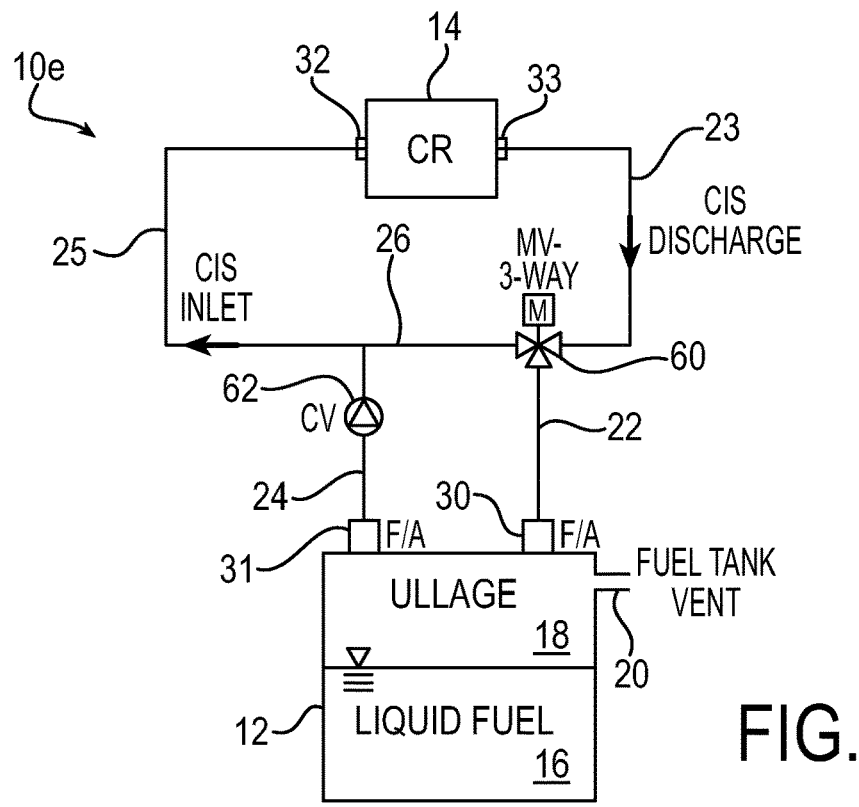
FIG. 8 is a drawing depicting another exemplary catalytic inerting system (CIS) architecture similar to FIG. 7, employing a 3-way modulating valve and a check valve for flow control.

FIG. 8 is a drawing depicting another exemplary catalytic inerting system (CIS) architecture 10*e*. FIG. 8 is comparable in configuration and operation as FIG. 7, except a check valve 62 is provided at the fuel tank outlet 24 instead of using a shutoff valve. The check valve in the fuel tank outlet operates to isolate the system when the 3-way modulating valve is operated in the isolation mode for the recirculating flow through the bypass loop. By using a passive check valve in the fuel tank outlet, some simplicity and cost savings is achieved for the system. However, by using a passive check valve, positive fuel tank isolation is not guaranteed. For example, during an aircraft dive, the ullage gas pressure may rise enough to uncheck the check valve which would prevent entering the isolation mode.

Figure 9:
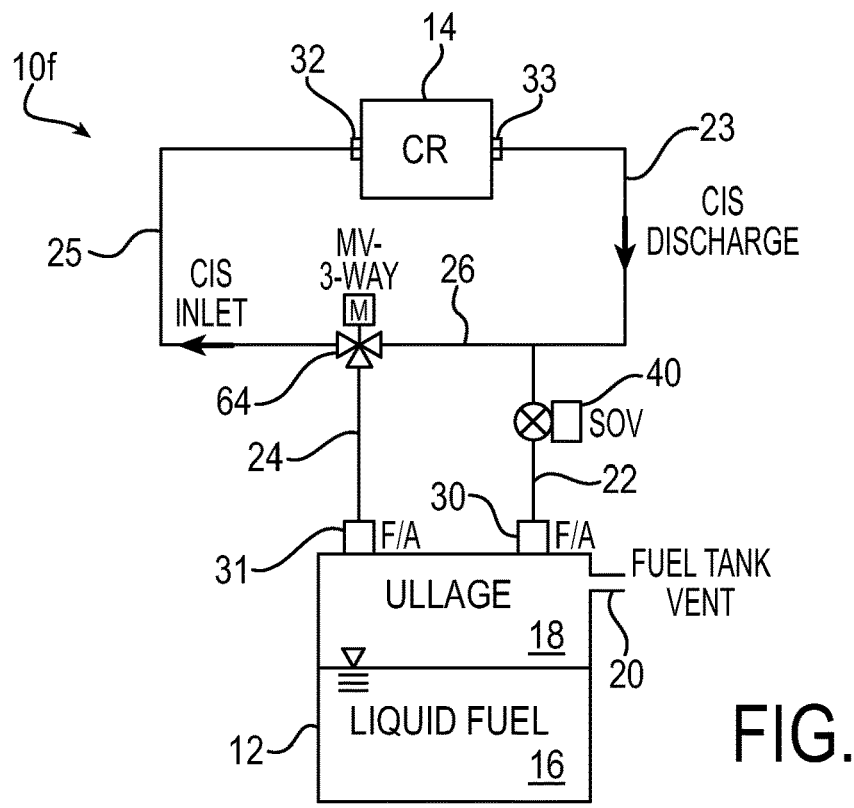
FIG. 9, FIG. 9A, FIG. 9B, and FIG. 9C are drawings depicting additional exemplary catalytic inerting system (CIS) architectures, employing a 3-way valve connecting the fuel tank discharge line, the CIS inlet line and the bypass line in combination with a shutoff valve for flow control.

FIG. 9 is a drawing depicting another exemplary catalytic inerting system (CIS) architecture 10*f*. In this example, a modulating 3-way valve is incorporated at the intersection between the fuel tank outlet and the bypass line for controlling the flow across the bypass line and into the catalytic inlet 25. As in the other 3-way valve embodiments, using the modulating 3-way valve has advantages in that the bypass flow ratio is variable during operation, and inerting performance can be maximized when the bypass flow is required. The use of a 3-way valve also reduces the number of total components by combining flow control through the bypass line and fuel tank outlet with a single component, providing a greater degree of control with fewer components. 3-way modulating valves, however, require more complexity in the control system and can be expensive as individual components, and may need to be a custom component designed for a particular application or system.

Referring to FIG. 9, in this example the CIS architecture 10*f* includes a modulating 3-way valve 64 that is incorporated at the intersection between the fuel tank outlet 24 and the bypass line 26 for controlling the flow across the bypass line and into the catalytic inlet 25. Accordingly, this example is similar to the previous 3-way valve embodiment, except the location of control is on the fuel tank outlet side. This embodiment further includes the non-modulating fuel tank inlet shutoff valve 40 similarly as in some of the previous embodiments, which is located at the fuel tank inlet 22 and is operable to quickly isolate the fuel tank from the remainder of the system for the isolation mode.

To place the system 10*f* in normal mode, the 3-way modulating valve 60 closes off the flow path through the bypass line 26 to prevent the bypass flow, but is open to permit flow from the fuel tank outlet 24 into the catalytic inlet 25. In addition, the fuel tank inlet shutoff valve 40 is open to permit the recirculating flow through the catalytic reactor 14. To switch the system 10*f* into the mixing mode, the 3-way modulating valve 64 further is opened to permit the additional flow of inert gas across the bypass line 26. Again, the bypass flow ratio can be variably controlled by controlling flow levels through the 3-way modulating valve particularly through the bypass line 26. To switch the system 10*f* into the isolation mode, the 3-way modulating valve 60 is opened to permit the bypass flow while being closed as to flow from the fuel tank inlet 24, and the fuel tank inlet shutoff valve 40 also is closed. Such valve states preclude flow into and out from the fuel tank 12. Accordingly, the recirculating flow through the catalytic reactor 14 is solely across the bypass loop through the bypass line 26.

Figure 9A:
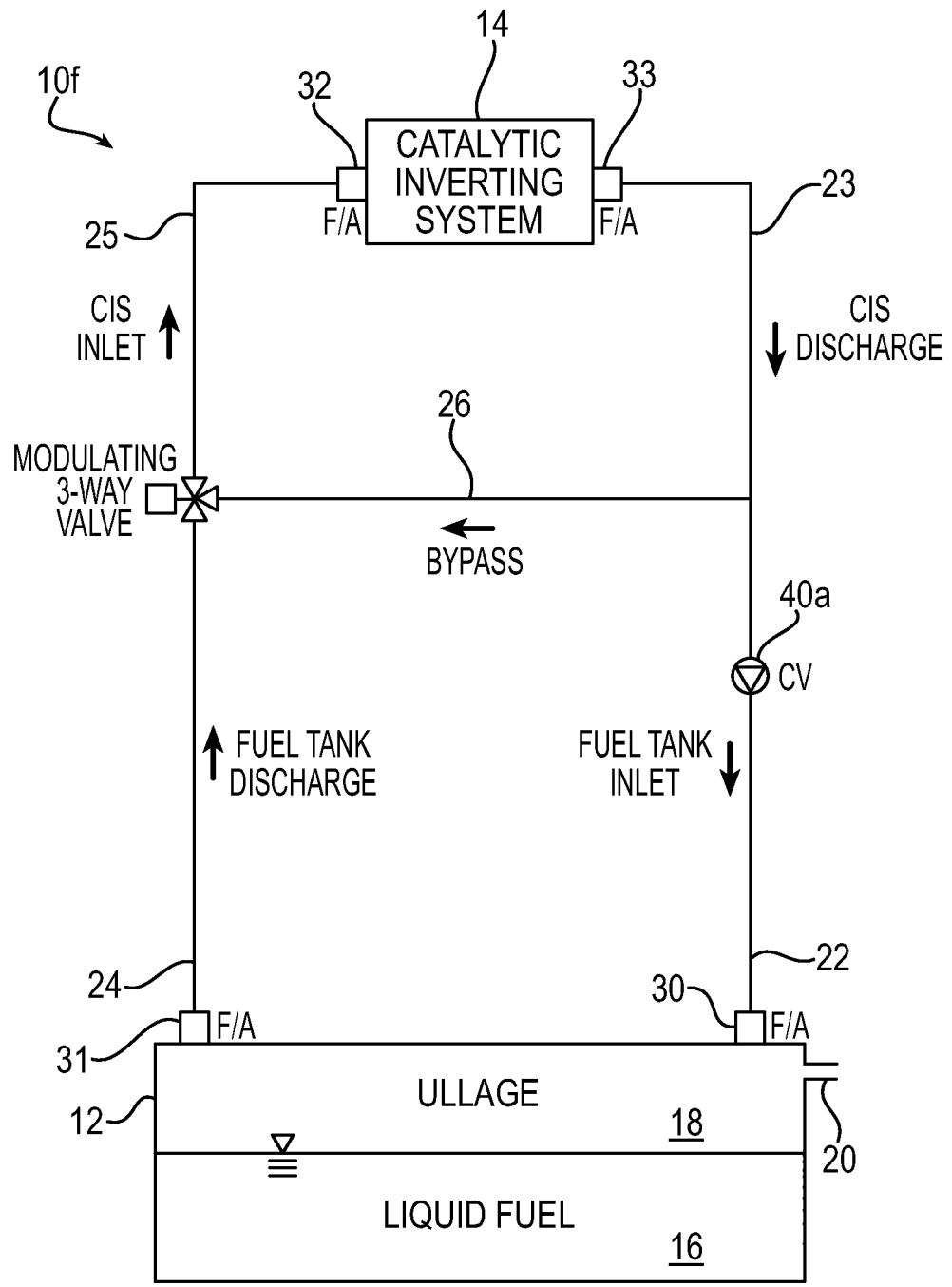
Figure 9B:
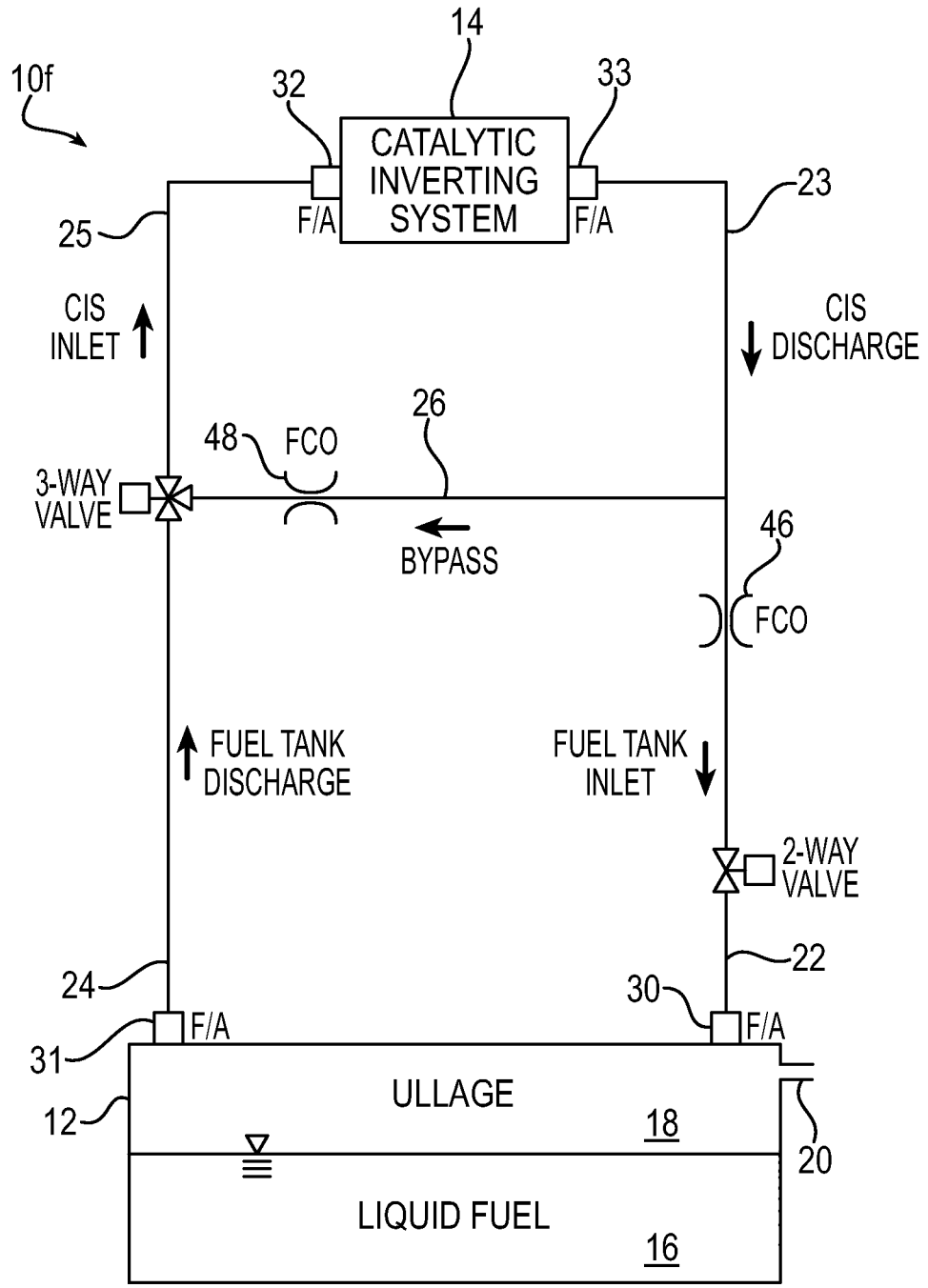
Figure 9C:
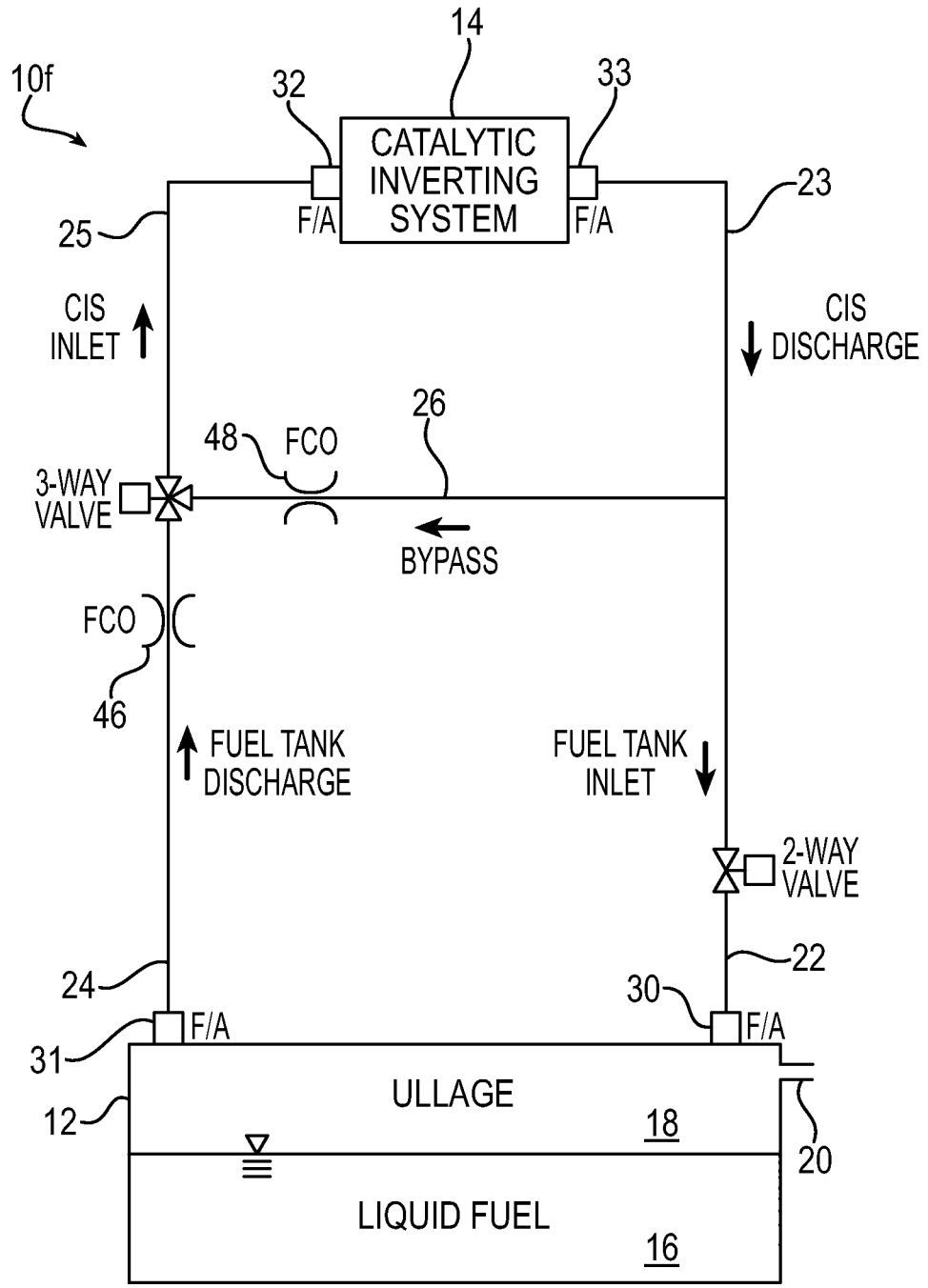

FIGS. 9A-9C are variations on the embodiment of FIG. 9, in which the specific configuration of the system is altered in one or more ways. In the embodiment of FIG. 9A, the two-way shutoff valve 40 instead is configured as a check valve 40*a*. The embodiment of FIG. 9B is a variation of the embodiment of FIG. 9 that replaces the modulating 3-way valve with a non-modulating 3-way valve and further includes the fuel tank inlet flow control orifice 46 and the bypass flow control orifice 48 that are present in other embodiments. In the embodiment of FIG. 9C, the modulating 3-way valve is replaced with a non-modulating 3-way valve and the flow control orifice 46 is provided on the fuel tank outlet side.

Figure 10:
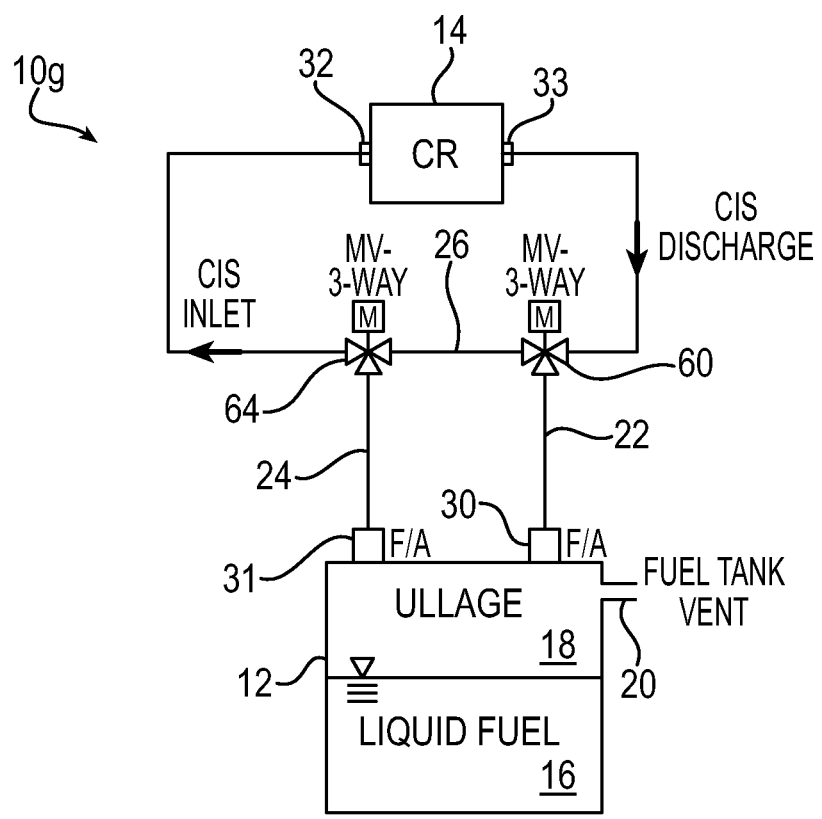
FIG. 10, FIG. 10A, and FIG. 10B are drawings depicting additional exemplary catalytic inerting system (CIS) architectures, employing multiple 3-way valves for flow control.
Figure 10A:
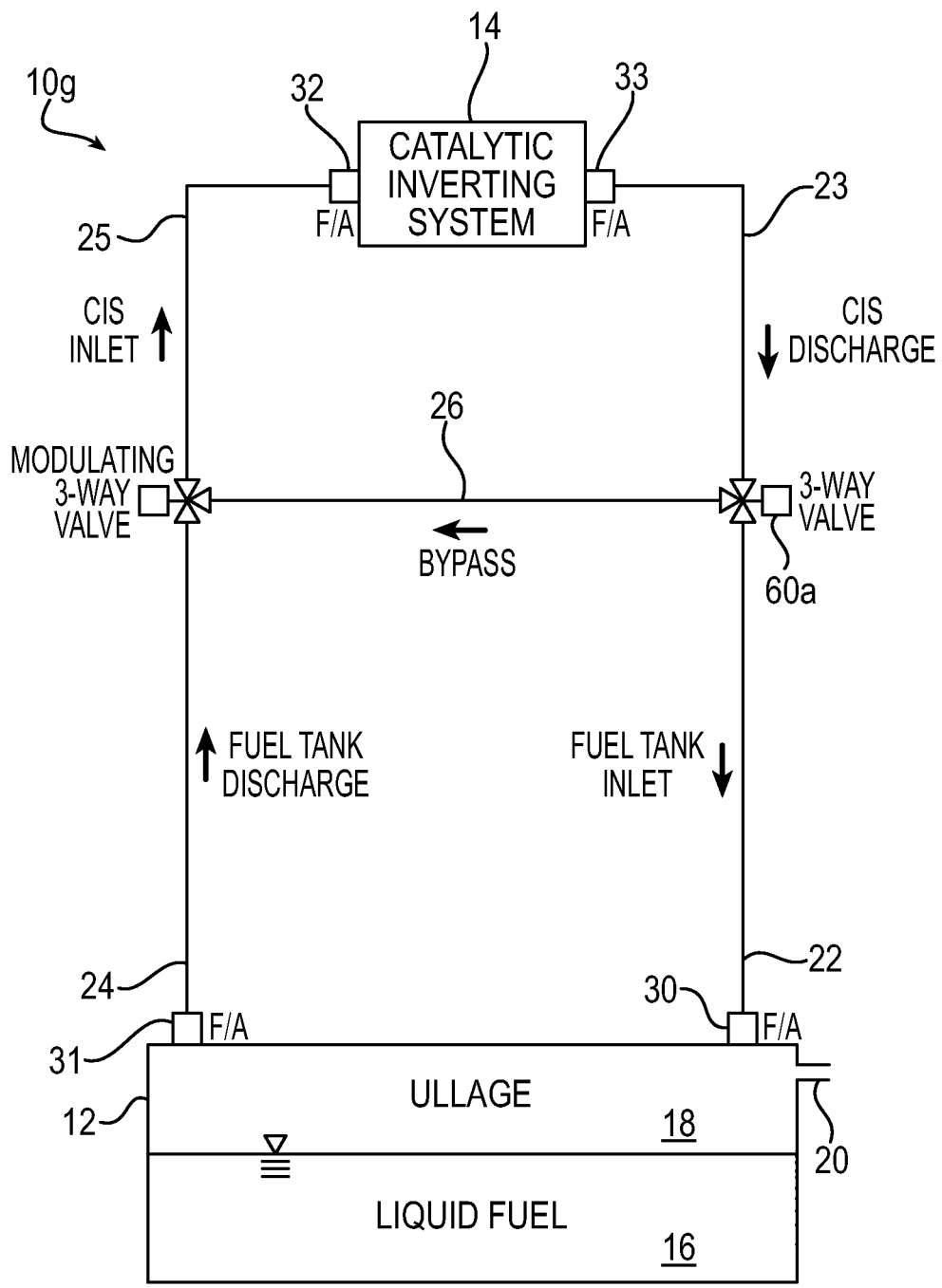
Figure 10B:
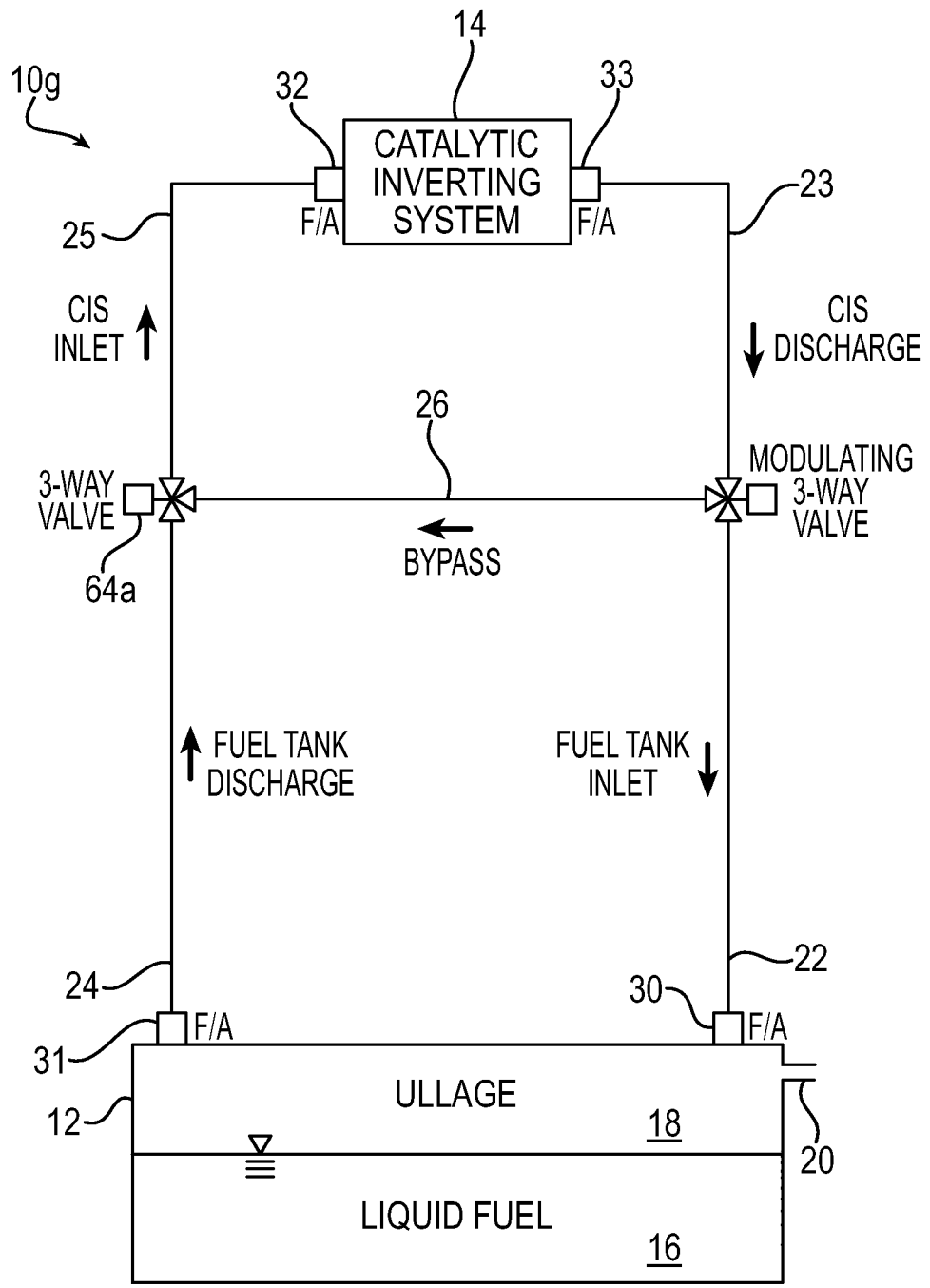

FIG. 10 is a drawing depicting another exemplary catalytic inerting system (CIS) architecture 10*g*. The example of FIG. 10 is comparable in configuration and operation as FIGS. 8 and 9, except this embodiment combines the use of the two 3-way modulating valves 60 and 64. This embodiment maximizes the level of flow control, but would require the most complex control system to achieve such maximum control. FIGS. 10A-10B are variations on the embodiment of FIG. 10, in which the specific configuration of the system is altered in one or more ways. In the embodiment of FIG. 10A, the 3-way modulating valve 60 instead is configured as a 3-way non-modulating valve 60*a*. In the embodiment of FIG. 10B, the 3-way modulating valve 64 instead is configured as a 3-way non-modulating valve 64*a*.

Figure 11:
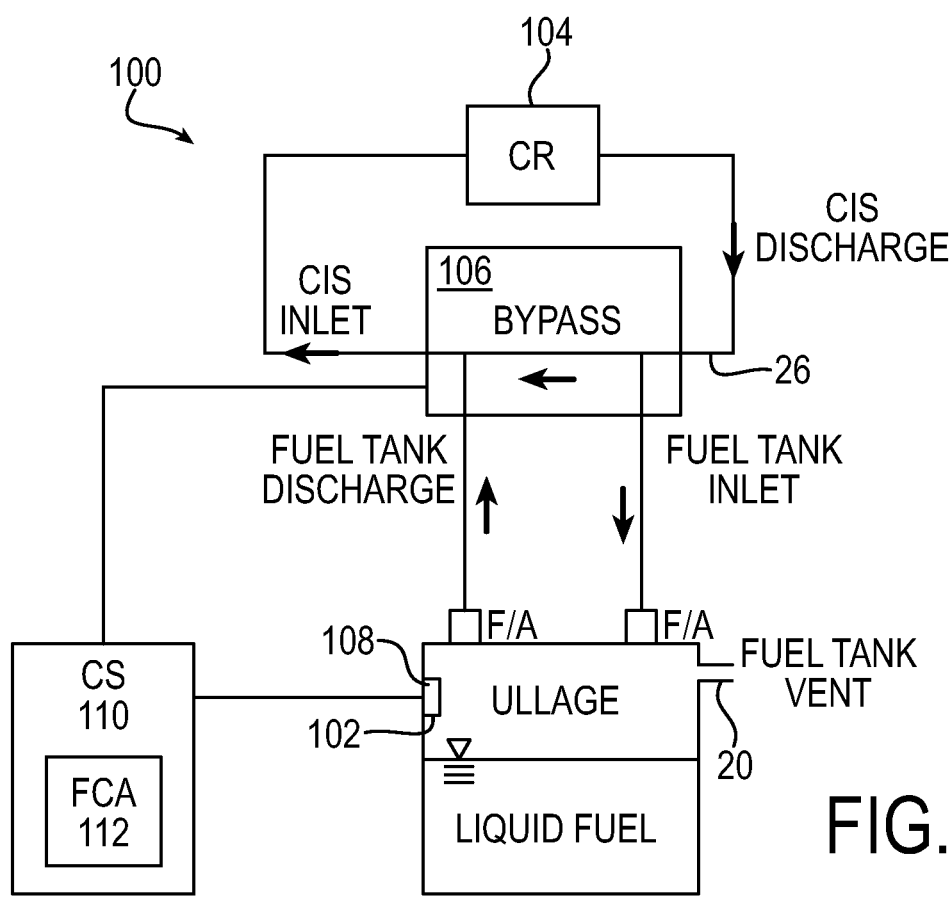
FIG. 11 is a drawing depicting a block diagram of an exemplary CIS architecture in accordance with embodiments of the present invention, which depicts control system features.

FIG. 11 is a drawing depicting a block diagram of an exemplary CIS architecture 100 in accordance with embodiments of the present invention, which depicts control system features. Similarly as the various embodiments, the system 100 may include a fuel tank 102 and a catalytic reactor 104, which are linked by the various inlet, outlet, and bypass flow pathways as described above. Flow control components 106 are depicted in this embodiment generally as a block component for control of gas flows between the fuel tank 102 and catalytic reactor 104, and through the bypass line 26. It will be appreciated that the flow control components 106 may be configured to have any suitable combination of check valves, flow control orifices, non-modulating shut-off valves, and/or 2-way and 3-way modulating valves placed within the system architecture to control the flow of gases, including for example the configurations described above with respect to the exemplary embodiments of the other figures.

The system 100 further may include one or more sensor modules for sensing operating parameters of the system that may be associated with potential for a flammable condition. Such operating parameters, for example, may include temperature and fuel vapor concentration in the fuel tank, catalytic reactor, ullage gas and/or within gas flows at various locations in the system. In an exemplary and preferred embodiment, a sensor module 108 may be located at or within the fuel tank 102 to sense system parameters at or within the fuel tank, and particularly temperature and/or fuel vapor concentration, within the fuel tank or ullage gas located within the fuel tank. Additional sensor modules may be located at other portions of the system, such as for example at or within the catalytic reactor 104 to sense comparable system parameters at or within the catalytic reactor.

The system 100 further may include a control system 110 that can be employed to perform flow control methods based on system operating parameters read from the sensor module(s) 108. The control system may include a primary control circuit that is configured to carry out various control operations relating to control of the flow control components 106. Accordingly, the control system 110 may be configured an electronic processor, such as a CPU, microcontroller or microprocessor. Among the functions, to implement the features of the present invention, the control system 110 may comprise an electronic controller that may execute program code embodied as a flow control application 112. It will be apparent to a person having ordinary skill in the art of computer programming, and specifically in application programming for electronic control systems, how to program the control system to carry out logical functions associated with the application 112. Accordingly, details as to specific programming code have been left out for the sake of brevity. The flow control application 112 may be stored in a non-transitory computer readable medium, such as a random access memory (RAM), a read-only memory (ROM), an erasable programmable read-only memory (EPROM or Flash memory), or any other suitable medium that is incorporated as part of the control system. In the example of FIG. 11, the flow control application 112 is shown as being stored internally within the control system 110, but the application also may be stored in an additional or separate memory device. Also, while the code may be executed by a processor or control circuitry that is part of the control system 110, such controller functionality could also be carried out via dedicated hardware, firmware, software, or combinations thereof, without departing from the scope of the invention.

The CIS architecture 100, and as more particularly embodied in accordance with any of the examples depicted in the other figures, can be controlled in a manner that performs flow control methods for preventing a flammable condition from arising within the system. Although the exemplary control methods are described below as a specific order of executing functional logic steps, the order of executing the steps may be changed relative to the order described. Also, two or more steps described in succession may be executed concurrently or with partial concurrence. It is understood that all such variations are within the scope of the present invention.

In one exemplary method of operation, it may be presumed as an initial condition of operation, a CIS architecture is operating within the normal mode as described above. In such mode, the control system controls the flow control components to block flow across the bypass line while permitting the recirculating flow between the fuel tank and the catalytic reactor. An exemplary control method includes the steps of: sensing an operating parameter within the CIS architecture; determining whether the operating parameter satisfies a first predetermined condition; and when the sensed operating parameter satisfies the first predetermined condition, the control system controls the flow control components to switch the architecture to operating in the mixing mode; i.e., flow is permitted through the bypass line while also permitting the recirculating flow between the fuel tank and the catalytic reactor. The operating parameter, for example, may be sensed at the fuel tank and/or at the catalytic reactor, and may be temperature and/or fuel vapor concentration within the ullage gas or inert flows.

The flow control method further may include determining whether the operation of the CIS architecture satisfies a second predetermined condition (which may be the same or different from the first predetermined condition); and when the CIS architecture operation satisfies the second predetermined condition, the control system controls the flow control components to switch the architecture back to operating in the normal mode from the mixing. The second predetermined condition may be based on a duration of operating within the mixing mode, with the second predetermined condition being satisfied by operating within the mixing mode for a predetermined amount of time.

The flow control method further may include a startup mode. In the startup mode, upon initiation of operation of the CIS architecture 100, the control system controls the flow control components to operate the system architecture in the isolation mode, i.e., with flow being precluded to and from the tank and proceeding in a bypass loop through the catalytic reactor. When the sensed operation of the CIS architecture satisfies a predetermined startup condition, the control system controls the flow control components to switch the CIS architecture to operating in the normal mode. The predetermined startup condition, for example, may be a minimum operating temperature or a predetermined amount of time of operating in the isolation mode. On system startup, therefore, the flow control mechanism is configured in the isolation mode and remains in the isolation mode during catalytic reactor warmup. When the catalytic reactor has reached some minimum temperature, either based on actual temperature measurement or based on a predetermined time, the recirculation flow of the normal mode starts. In this manner, any fuel that had been left in the bypass loop from prior usage will be consumed during this startup isolation mode inerting phase.

The flow control method further may include a shutdown mode. In the shutdown mode, upon initiation of a shutdown operation of the CIS architecture 100, the control system controls the flow control components to switch the architecture from operating in the normal mode or mixing mode to operating in the isolation mode. The CIS architecture may continue to operate in the isolation mode until a predetermined shutdown condition is satisfied. The predetermined shutdown condition, for example, may be a minimum operating temperature or a predetermined amount of time of operating in the isolation mode. In an example of control of a CIS architecture for an aircraft, the shutdown mode permits a cool down of the catalytic reactor. After flight and before system shutdown, with the catalytic reactor still warm, the flow control mechanism is configured in the isolation mode and a post-flight isolation mode inerting phase takes place. This ensures the system is shut down in a safe condition with the fuel tank isolated and bypass loop being rendered inert.

An aspect of the invention, therefore, is a catalytic inerting system (CIS) architecture that has a bypass line that can be employed to mix an inert flow with ullage gas from the fuel tank to avoid a flammable condition. In exemplary embodiments, the CIS architecture includes: a fuel tank including a fuel tank inlet and a fuel tank outlet, the fuel tank defining a space for containing a liquid fuel and further defining an ullage space above the liquid fuel containing an ullage gas; a catalytic reactor in fluid communication with the fuel tank, the catalytic reactor having a catalytic inlet and a catalytic outlet, wherein the catalytic reactor receives an ullage gas flow from the fuel tank outlet and performs a catalytic reaction on the ullage gas to produce a more inert flow from the catalytic outlet to the fuel tank inlet; a bypass line that provides a flow pathway between the fuel tank inlet and the fuel tank outlet, thereby bypassing the fuel tank; and a flow control mechanism that controls relative flows of the inert flow from the catalytic outlet to the fuel tank inlet versus through the bypass line. The CIS architecture may include one or more of the following features, either individually or in combination.

In an exemplary embodiment of the CIS architecture, the flow control mechanism includes a flow control component in one or more of the fuel tank outlet, fuel tank inlet, and bypass line.

In an exemplary embodiment of the CIS architecture, the flow control mechanism includes a flow control component in all three of the fuel tank inlet, fuel tank outlet, and the bypass line.

In an exemplary embodiment of the CIS architecture, the flow control mechanism comprises a non-modulating shutoff valve in one or more of the fuel tank inlet, fuel tank outlet, and the bypass line.

In an exemplary embodiment of the CIS architecture, the flow control mechanism comprises a non-modulating shutoff valve in all three of the fuel tank inlet, fuel tank outlet, and the bypass line.

In an exemplary embodiment of the CIS architecture, the flow control mechanism further includes a flow control orifice in the bypass line and/or the fuel tank inlet.

In an exemplary embodiment of the CIS architecture, the flow control mechanism comprises a non-modulating shutoff valve in each of the fuel tank outlet and fuel tank inlet, and a flow control orifice in the bypass line.

In an exemplary embodiment of the CIS architecture, the flow control mechanism comprises a modulating shutoff valve in one or more of the fuel tank inlet, fuel tank outlet, and the bypass line.

In an exemplary embodiment of the CIS architecture, the flow control mechanism comprises a modulating shutoff valve in all three of the fuel tank inlet, fuel tank outlet, and the bypass line.

In an exemplary embodiment of the CIS architecture, the flow control mechanism comprises a modulating shutoff valve in each of the fuel tank inlet and the bypass line, and a non-modulating shutoff valve in the fuel tank outlet.

In an exemplary embodiment of the CIS architecture, the flow control mechanism comprises a modulating 3-way valve at an intersection between the fuel tank inlet and the bypass line, and another flow control component in the fuel tank outlet.

In an exemplary embodiment of the CIS architecture, the flow control component in the fuel tank outlet is a non-modulating shutoff valve.

In an exemplary embodiment of the CIS architecture, the flow control component in the fuel tank outlet is a check valve.

In an exemplary embodiment of the CIS architecture, the flow control mechanism comprises a modulating 3-way valve at an intersection between the fuel tank outlet and the bypass line, and a non-modulating shutoff valve in the fuel tank inlet.

In an exemplary embodiment of the CIS architecture, the flow control mechanism comprises a first modulating 3-way valve at an intersection between the fuel tank inlet and the bypass line, and a second modulating 3-way valve at an intersection between the fuel tank outlet and the bypass line.

In an exemplary embodiment of the CIS architecture, the CIS architecture further includes flame arrestors located at the fuel tank inlet and the fuel tank outlet.

In an exemplary embodiment of the CIS architecture, the CIS architecture further includes flame arrestors located at the catalytic inlet and the catalytic outlet.

In an exemplary embodiment of the CIS architecture, the CIS architecture further includes a sensor for sensing an operating parameter within the CIS architecture; and a control system configured to control the flow control mechanism based on the sensed operating parameter to control relative flows of the inert flow from the catalytic outlet to the fuel tank inlet versus through the bypass line.

Another aspect of the invention is a method of controlling flow through a catalytic inerting system (CIS) architecture, the CIS architecture being configured according to any of the embodiments. In exemplary embodiments, the method includes the steps of: operating in a normal mode in which the bypass line is closed and the inert flow from the catalytic outlet is flowing into the ullage space through the fuel tank inlet and ullage gas flows out of the ullage space through the fuel tank outlet to the catalytic inlet; sensing an operating parameter within the CIS architecture; determining whether the operating parameter satisfies a first predetermined condition corresponding to a potential for a flammable condition; and when the first predetermined condition is satisfied, operating in a mixing mode in which the bypass line, fuel tank inlet, and fuel tank outlet are all open such that at least a portion of the inert flow from the catalytic outlet passes through the bypass line and mixes with ullage gas flowing from the fuel tank outlet. The control method may include one or more of the following features, either individually or in combination.

In an exemplary embodiment of the control method, the CIS architecture further includes the operating parameter comprises temperature, and the first predetermined condition is whether the temperature rises above a low flammability limit for vapor fuel concentration in the ullage gas.

In an exemplary embodiment of the control method, the control method further includes, when operating in the mixing mode, determining whether operation of the CIS architecture satisfies a second predetermined condition, and when the second predetermined condition is satisfied, switching operation from the mixing mode back to the normal mode.

In an exemplary embodiment of the control method, the second predetermined condition is a duration of operating in the mixing mode for a predetermined amount of time.

In an exemplary embodiment of the control method, the second predetermined condition is the same as the first predetermined condition.

In an exemplary embodiment of the control method, the control method further includes operating in an isolation mode in which the fuel tank inlet and fuel tank outlet are closed on a fuel tank side of the bypass line, and the bypass line is open, such that the inert flow from the catalytic outlet is flowing only through the bypass line from the catalytic outlet and into the catalytic inlet, thereby completely isolating the fuel tank from the catalytic reactor.

In an exemplary embodiment of the control method, the control method further includes operating in a startup mode comprising: upon initiation of operation of the CIS architecture, operating in the isolation mode; and when operation of the CIS architecture satisfies a predetermined startup condition, switching the CIS architecture to operating in the normal mode or mixing mode.

In an exemplary embodiment of the control method, the predetermined startup condition is a minimum operating temperature or a predetermined amount of time of operating in the isolation mode.

In an exemplary embodiment of the control method, the control method further includes operating in a shutdown mode comprising: upon initiation of a shutdown operation of the CIS architecture, switching the CIS architecture from operating in the normal mode or mixing mode to operating in the isolation mode; and operating in the isolation mode until operation of the CIS architecture satisfies a predetermined shutdown condition.

In an exemplary embodiment of the control method, the predetermined shutdown condition is a minimum operating temperature or a predetermined amount of time of operating in the isolation mode.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A catalytic inerting system (CIS) architecture comprising:
   a fuel tank including a fuel tank inlet and a fuel tank outlet, the fuel tank defining a space for containing a liquid fuel and further defining an ullage space above the liquid fuel containing an ullage gas;
   a catalytic reactor in fluid communication with the fuel tank, the catalytic reactor having a catalytic inlet and a catalytic outlet, wherein the catalytic reactor receives an ullage gas flow from the fuel tank outlet and performs a catalytic reaction on the ullage gas to produce a more inert flow from the catalytic outlet to the fuel tank inlet;
   a bypass line that provides a flow pathway between the fuel tank inlet and the fuel tank outlet, thereby bypassing the fuel tank; and
   a flow control mechanism that controls relative flows of the inert flow from the catalytic outlet to the fuel tank inlet versus through the bypass line.

2. The CIS architecture of claim 1, wherein the flow control mechanism includes a flow control component in one or more of the fuel tank outlet, fuel tank inlet, and bypass line.

3. The CIS architecture of claim 1, wherein the flow control mechanism includes a flow control component in all three of the fuel tank inlet, fuel tank outlet, and the bypass line.

4. The CIS architecture of claim 1, wherein the flow control mechanism comprises a non-modulating shutoff valve in one or more of the fuel tank inlet, fuel tank outlet, and the bypass line.

5. The CIS architecture of claim 4, wherein the flow control mechanism comprises a non-modulating shutoff valve in all three of the fuel tank inlet, fuel tank outlet, and the bypass line.

6. The CIS architecture of claim 5, wherein the flow control mechanism further includes a flow control orifice in the bypass line and/or the fuel tank inlet.

7. The CIS architecture of claim 4, wherein the flow control mechanism comprises a non-modulating shutoff valve in each of the fuel tank outlet and fuel tank inlet, and a flow control orifice in the bypass line.

8. The CIS architecture of claim 1, wherein the flow control mechanism comprises a modulating shutoff valve in one or more of the fuel tank inlet, fuel tank outlet, and the bypass line.

9. The CIS architecture of claim 8, wherein the flow control mechanism comprises a modulating shutoff valve in all three of the fuel tank inlet, fuel tank outlet, and the bypass line.

10. The CIS architecture of claim 8, wherein the flow control mechanism comprises a modulating shutoff valve in each of the fuel tank inlet and the bypass line, and a non-modulating shutoff valve in the fuel tank outlet.

11. The CIS architecture of claim 1, wherein the flow control mechanism comprises a modulating 3-way valve at an intersection between the fuel tank inlet and the bypass line, and another flow control component in the fuel tank outlet.

12. The CIS architecture of claim 11, wherein the flow control component in the fuel tank outlet is a non-modulating shutoff valve.

13. The CIS architecture of claim 11, wherein the flow control component in the fuel tank outlet is a check valve.

14. The CIS architecture of claim 1, wherein the flow control mechanism comprises a modulating 3-way valve at an intersection between the fuel tank outlet and the bypass line, and a non-modulating shutoff valve in the fuel tank inlet.

15. The CIS architecture of claim 1, wherein the flow control mechanism comprises a first modulating 3-way valve at an intersection between the fuel tank inlet and the bypass line, and a second modulating 3-way valve at an intersection between the fuel tank outlet and the bypass line.

16. The CIS architecture of claim 1, further comprising flame arrestors located at the fuel tank inlet and the fuel tank outlet.

17. The CIS architecture of claim 1, further comprising flame arrestors located at the catalytic inlet and the catalytic outlet.

18. The CIS architecture of claim 1, further comprising:
   a sensor for sensing an operating parameter within the CIS architecture; and
   a control system configured to control the flow control mechanism based on the sensed operating parameter to control relative flows of the inert flow from the catalytic outlet to the fuel tank inlet versus through the bypass line.

19. A method of controlling flow through a catalytic inerting system (CIS) architecture, the CIS architecture comprising:
   a fuel tank including a fuel tank inlet and a fuel tank outlet, the fuel tank defining a space for containing a liquid fuel and further defining an ullage space above the liquid fuel containing an ullage gas;
   a catalytic reactor in fluid communication with the fuel tank, the catalytic reactor having a catalytic inlet and a catalytic outlet, wherein the catalytic reactor receives an ullage gas flow from the fuel tank outlet and performs a catalytic reaction on the ullage gas to produce a more inert flow from the catalytic outlet to the fuel tank inlet;
   a bypass line that provides a flow pathway between the fuel tank inlet and the fuel tank outlet, thereby bypassing the fuel tank; and a flow control mechanism that controls relative flows of the inert flow from the catalytic outlet to the fuel tank inlet versus through the bypass line;

the method comprising the steps of:

operating in a normal mode in which the bypass line is closed and the inert flow from the catalytic outlet is flowing into the ullage space through the fuel tank inlet and ullage gas flows out of the ullage space through the fuel tank outlet to the catalytic inlet;

sensing an operating parameter within the CIS architecture;

determining whether the operating parameter satisfies a first predetermined condition corresponding to a potential for a flammable condition; and when the first predetermined condition is satisfied, operating in a mixing mode in which the bypass line, fuel tank inlet, and fuel tank outlet are all open such that at least a portion of the inert flow from the catalytic outlet passes through the bypass line and mixes with ullage gas flowing from the fuel tank outlet.

20. The control method of claim 19, wherein the operating parameter comprises temperature, and the first predetermined condition is whether the temperature rises above a low flammability limit for vapor fuel concentration in the ullage gas.

21. The control method of claim 19, further comprising, when operating in the mixing mode, determining whether operation of the CIS architecture satisfies a second predetermined condition, and when the second predetermined condition is satisfied, switching operation from the mixing mode back to the normal mode.

22. The control method of claim 21, wherein the second predetermined condition is a duration of operating in the mixing mode for a predetermined amount of time.

23. The control method of claim 21, wherein the second predetermined condition is the same as the first predetermined condition.

24. The control method of claim 19, further comprising operating in an isolation mode in which the fuel tank inlet and fuel tank outlet are closed on a fuel tank side of the bypass line, and the bypass line is open, such that the inert flow from the catalytic outlet is flowing only through the bypass line from the catalytic outlet and into the catalytic inlet, thereby completely isolating the fuel tank from the catalytic reactor.

25. The control method of claim 24, further comprising operating in a startup mode comprising:

upon initiation of operation of the CIS architecture, operating in the isolation mode; and when operation of the CIS architecture satisfies a predetermined startup condition, switching the CIS architecture to operating in the normal mode or mixing mode.

26. The control method of claim 25, wherein the predetermined startup condition is a minimum operating temperature or a predetermined amount of time of operating in the isolation mode.

27. The control method of claim 24, further comprising operating in a shutdown mode comprising:

upon initiation of a shutdown operation of the CIS architecture, switching the CIS architecture from operating in the normal mode or mixing mode to operating in the isolation mode; and operating in the isolation mode until operation of the CIS architecture satisfies a predetermined shutdown condition.

28. The control method of claim 27, wherein the predetermined shutdown condition is a minimum operating temperature or a predetermined amount of time of operating in the isolation mode.

* * * * *